(12) United States Patent
Chasen et al.

(10) Patent No.: US 9,311,283 B2
(45) Date of Patent: Apr. 12, 2016

(54) SYSTEM FOR CLIPPING WEBPAGES BY TRAVERSING A DOM, AND HIGHLIGHTING A MINIMUM NUMBER OF WORDS

(71) Applicant: RealNetworks, Inc., Seattle, WA (US)

(72) Inventors: Jeffrey Chasen, Redmond, WA (US); Niall Smart, Seattle, WA (US); Todd Oquist, Seattle, WA (US); Michael Ari Cohen, Seattle, WA (US); John Schussler, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 302 days.

(21) Appl. No.: 13/969,311

(22) Filed: Aug. 16, 2013

(65) Prior Publication Data
US 2014/0053061 A1      Feb. 20, 2014

Related U.S. Application Data

(60) Provisional application No. 61/683,820, filed on Aug. 16, 2012.

(51) Int. Cl.
| | |
|---|---|
| G06F 17/00 | (2006.01) |
| G06F 17/22 | (2006.01) |
| G06F 17/30 | (2006.01) |
| G06F 3/0484 | (2013.01) |

(52) U.S. Cl.
CPC ........ *G06F 17/2247* (2013.01); *G06F 3/04842* (2013.01); *G06F 17/00* (2013.01); *G06F 17/3089* (2013.01); *G06F 17/30899* (2013.01)

(58) Field of Classification Search
CPC .................................................. G06F 3/04842
See application file for complete search history.

(56) References Cited

U.S. PATENT DOCUMENTS

| | | | |
|---|---|---|---|
| 7,386,783 B2 * | 6/2008 | Lection et al. | 715/203 |
| 2007/0106952 A1 * | 5/2007 | Matas et al. | 715/764 |
| 2009/0063699 A1 * | 3/2009 | Chapweske et al. | 709/233 |
| 2011/0302510 A1 * | 12/2011 | Harrison et al. | 715/760 |
| 2013/0185658 A1 * | 7/2013 | Sun et al. | 715/753 |
| 2013/0290828 A1 * | 10/2013 | Flake et al. | 715/234 |

OTHER PUBLICATIONS

Stackoverflow, "jQuery: How to find an image by is src", Aug. 6, 2015, Wayback Machine—https://archive.org/, pp. 1-2.*
Webdeveloper.com. "div layer over a flash movie help", Nov. 6, 2006 and Jan. 29, 2010, pp. 1-3.*
Techsmith.com. "tutorial snagit using all in one capture" Jul. 10, 2012 Wayback Machine—https://archive.org/, pp. 1-4.*

* cited by examiner

*Primary Examiner* — Cesar Paula
*Assistant Examiner* — Benjamin Norris
(74) *Attorney, Agent, or Firm* — AEON Law; Adam L. K. Philipp

(57) ABSTRACT

Disclosed is software which enables a service which allows users to load screen-shots of webpages to boards as clipped content, which preserves "live" links to the webpages from the clipped content, which identifies the content which was clipped, and which preserves links and other dynamic content in the clipped content.

16 Claims, 24 Drawing Sheets

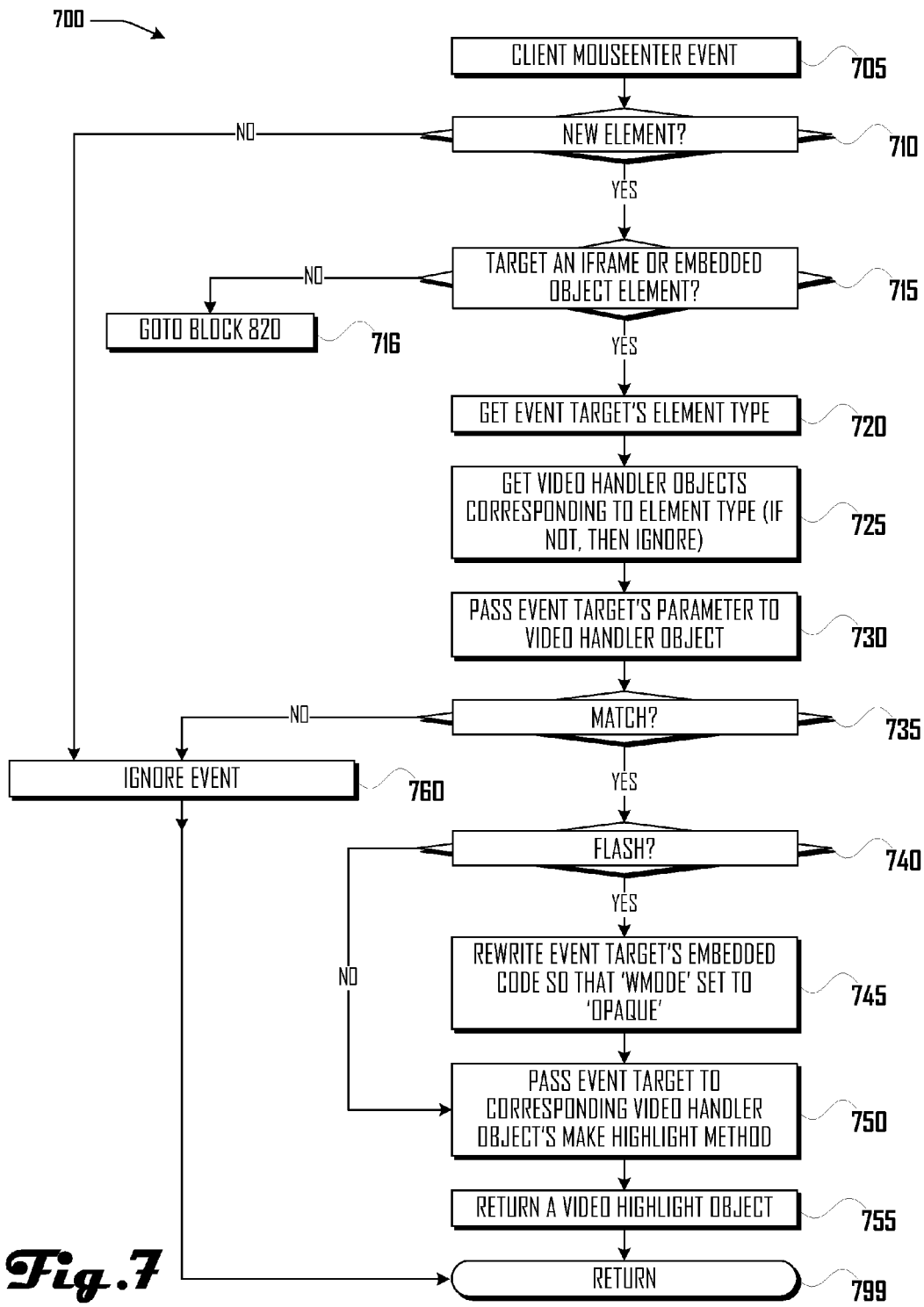

SYSTEM FOR CLIPPING WEBPAGES BY TRAVERSING A DOM, AND HIGHLIGHTING A MINIMUM NUMBER OF WORDS

BACKGROUND INFORMATION

Services such as "Pinterest" and "Clipboard" exist which allow people to use browser software to publicly or privately "clip" webpages. The clipped webpages are stored as screen-shots on what are sometimes called "boards;" the boards are webpages accessed by users and may include annotations ("notes") by the user, in addition to the screen-shots. Access to a board may be controlled by user- or system-set permissions, which may require a particular login (in the case of a private board) or which may allow any login (or no login) to access the board (in the case of a public board).

Such services, however, are limited to the types of content which may be clipped on the boards and may only include a screen-shot or video capture of the clipped content. For example, the screen-shot of a clipped webpage may not have live links and may be relatively non-interactive compared to the original webpage, effectively making a copy of the original webpage, but without preserving the original webpage's links and without updating or archiving dynamic webpage content, such as interactive calendars. This may not be a copyright issue if the board is private and/or a copyright fair-use exception applies, but if the board is public, the copy may then result in copyright infringement as well as revenue (such as advertising revenue) for the operator of the clipboard service without consent from or compensation to the copyright holder. Other services may include a first frame in the public or private user board, which first frame includes notes entered by a user, which first frame may be categorized by the user or by the system, and which first frame may include a screen-shot of the original webpage or webpage content. The original webpage may then be linked to, as it then exists as a "live" webpage, within a second frame. However, and particularly for webpages with a lot of content, it can then be difficult to identify the portion clipped in the first frame within the live webpage in the second frame.

Needed is a system which allows users to link to and note specific portions of a webpage via clipping, wherein clips allow later access to a cached or live version of the webpage, and which identifies which portion of the webpage was clipped.

SUMMARY

Disclosed is a service which allows users to load screen-shots of webpages to boards as clipped content, which preserves "live" links to the webpages from the clipped content, which identifies the content which was clipped, and which preserves links and other dynamic content in the clipped content.

BRIEF DESCRIPTION OF THE DRAWINGS

FIG. 7 is a flowchart illustrating an embodiment of a Highlight Video Object Routine 700 performed in a Client Device 400.

DETAILED DESCRIPTION

Figure 1:
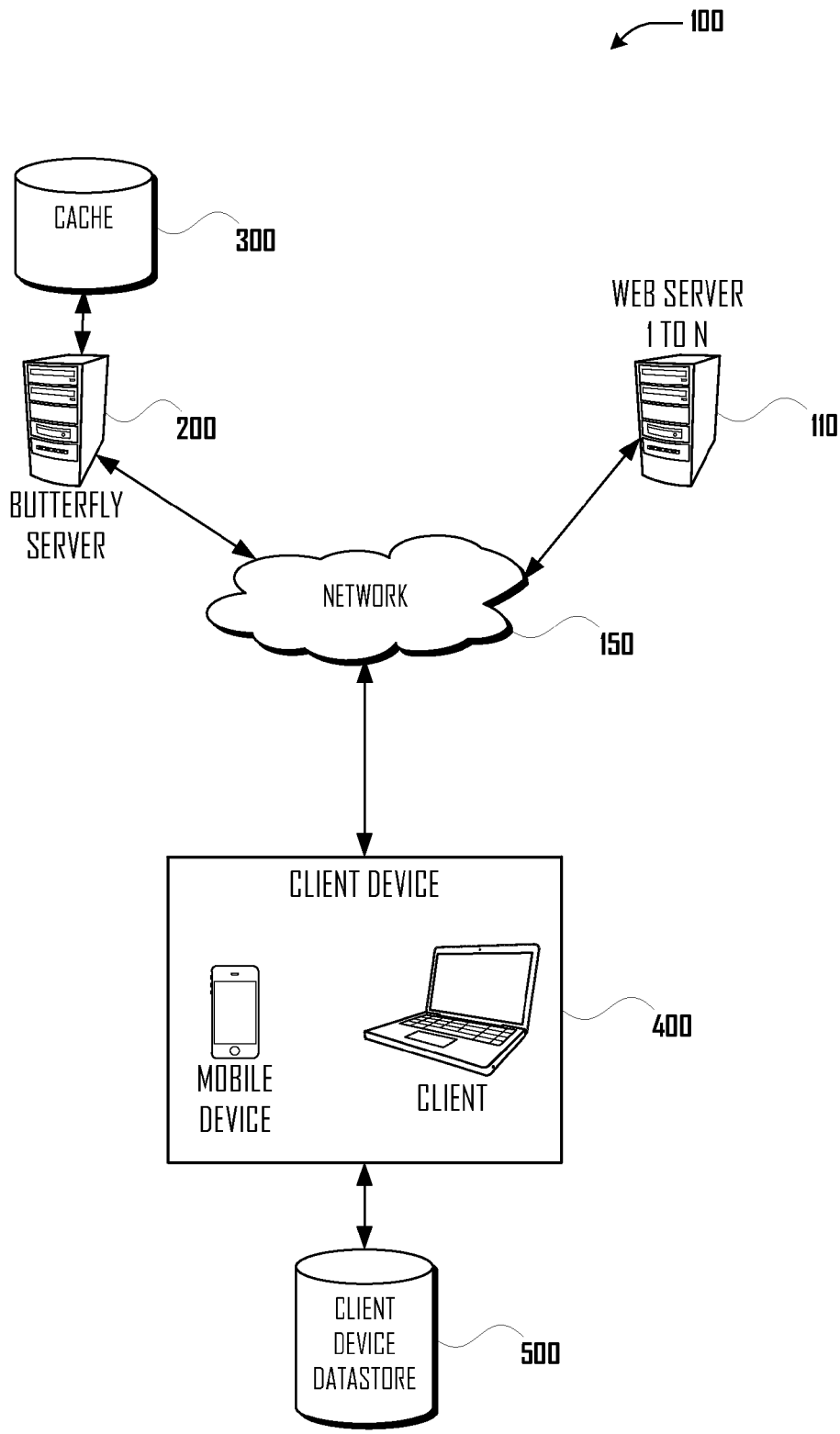
FIG. 1 is a network and device diagram illustrating exemplary computing devices configured according to embodiments disclosed in this paper.

The following description provides specific details for an understanding of various examples or embodiments of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; coupling between the elements can be physical, logical, or a combination thereof. Additionally, the words, "herein," "above," "below," and words of similar import, when used in this application, shall refer to this application as a whole and not to particular portions of this application. When the context permits, words in the Detailed Description using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

As used herein, a Uniform Resource Identifier ("URI") is a string of characters used to identify a resource on a computing device and/or a network, such as the Internet. Such identification enables interaction with representations of the resource using specific protocols. "Schemes" specifying a syntax and associated protocols define each URI.

The generic syntax for URI schemes is defined in Request for Comments ("RFC") memorandum 3986 published by the Internet Engineering Task Force ("IETF"). According to RFC 3986, a URI (including a URL) consists of four parts:

<scheme name>: <hierarchical part> [?<query>] [#<fragment>]

A URI begins with a scheme name that refers to a specification for assigning identifiers within that scheme. The scheme name consists of a letter followed by any combination of letters, digits, and the plus ("+"), period ("."), or hyphen ("-") characters; and is terminated by a colon (":").

The hierarchical portion of the URL is intended to hold identification information that is hierarchical in nature. Often this part is delineated with a double forward slash ("//"), followed by an optional authority part and an optional path.

The optional authority part holds an optional user information part (not shown) terminated with "@" (e.g. username: password@), a hostname (i.e., domain name or IP address, here "example.com"), and an optional port number preceded by a colon ":".

The path part is a sequence of one or more segments (conceptually similar to directories, though not necessarily representing them) separated by a forward slash ("/"). If a URI includes an authority part, then the path part may be empty.

The optional query portion is delineated with a question mark and contains additional identification information that is not necessarily hierarchical in nature. Together, the path part and the query portion identify a resource within the scope of the URI's scheme and authority. The query string syntax is not generically defined, but is commonly organized as a sequence of zero or more <key>=<value> pairs separated by a semicolon or ampersand, for example:

key1=value1;key2=value2;key3=value3 (Semicolon), or
key1=value1&key2=value2&key3=value3 (Ampersand)

Much of the above information is taken from RFC 3986, which provides additional information related to the syntax and structure of URIs. RFC 3986 is hereby incorporated by reference, for all purposes.

FIG. 1 is a network and device diagram illustrating exemplary computing devices configured according to embodiments disclosed in this paper. In this figure, a Client Device 400 is a computer, including a personal computer, a mobile computing device (including a mobile phone), or similar, which computer executes an operating system and one or more routines constituting application software, which in this instance includes a browser application. The Client Device 400 is discussed further in relation to FIG. 4.

As shown in FIG. 1, the Client Device 400 connects to a Network 150, such as the Internet. Also connected to the Network 150 is a Webserver 110, which may be operated by a third party and which serves webpages including text, audio, and video which may be rendered by the Client Device 400 in a browser application, such as Client Browser 465 and which may serve software routines which may be executed by the Client Device 400, by or within the Client Browser 465, by another computing device, by another routine or application software, or by a combination of computing devices working in conjunction to create routines and application software. The Webserver 110 is depicted as one component, though it would be recognized that multiple discrete computers may provide the functions discussed in relation to the Webserver 110.

Also connected to the Network 150 is the Butterfly Server 200, which comprises a Butterfly Webserver 260. The Butterfly Webserver 260 serves webpages including text, audio, and video which may be rendered by the Client Browser 465 (webpages such as, for example, the "Butterfly Board 305" and "Archive Page 310") and serves software routines which may be executed by the Client Device 400, by or within the Client Browser 465, by another computing device, or by a combination of computing devices working in conjunction to create software routines and application software. This paper illustrates the Butterfly Server 200 as one component comprising sub-components and routines, though it would be recognized that multiple discrete computers may provide the functions discussed in relation to the Butterfly Server 200.

In an embodiment, a software routine served by the Butterfly Server 200 is the Butterfly App 315, which comprises routines executed by the Client Device 400 (including within or by the Client Browser 465—in browser contexts, the "Butterfly App" may also be referred to as a "plug-in" or "extension"), which Butterfly App 315 also interacts with the Butterfly Server 200 and the Webserver 110 (the Butterfly App 315 is discussed further in these papers). The Butterfly Server 200 is depicted as being connected to a Cache 300. As above, the Cache 300 may be a part of and/or share common physical computing hardware with the Butterfly Server 200 or, as depicted, the Cache 300 may be a separate logical and physical component. The Cache 300 may store screen-shots of webpages served by the Webserver 110, such as Webpage 320, and other clipped content from webpages; the Cache 300 may also store other components of the Butterfly Board 305 and the Archive Page 310, such as the html structure for webpages and websites, including for the Butterfly Board 305 and the Archive Page 310.

The Client Device 400 loads a webpage served by the Webserver 110, such as Webpage 320, and, using the Client Browser 465, renders the webpage within the Client Browser 465. The Butterfly App 315 enables software routine functions including a "Curl" (defined further herein) and user interactions with the Curl or "Curl Interactions." The Butterfly Board 305 may be, for example an interactive Javascript application downloaded to and executed by the Client Browser 465, with or without involvement of the Butterfly App 315.

Figure 18:
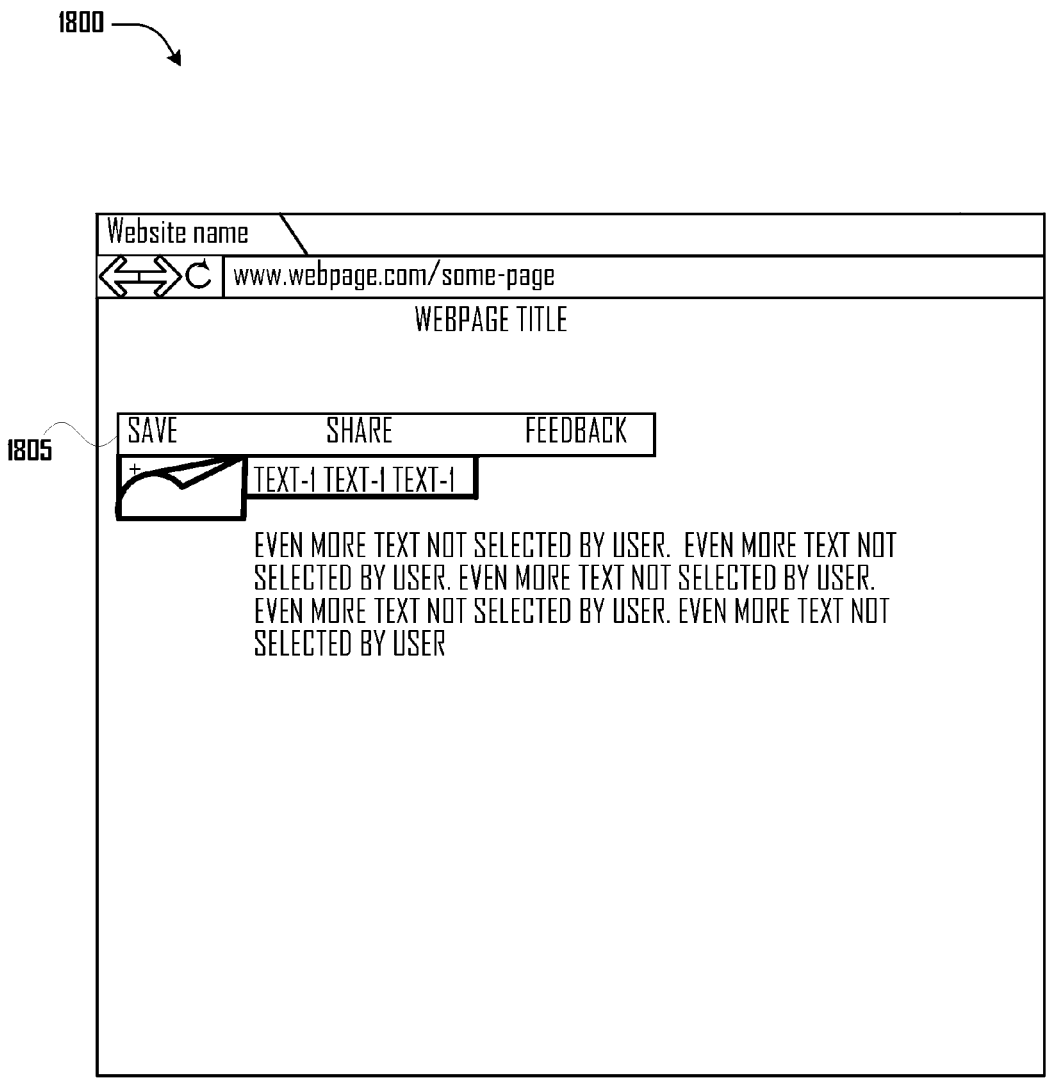
FIG. 18 is an illustration of an embodiment of a Client Device 400 interface generated by an embodiment of the disclosure, illustrating a webpage with a Selected Text Curl and presenting options for Curl Interactions with the Selected Text Curl.
Figure 19:
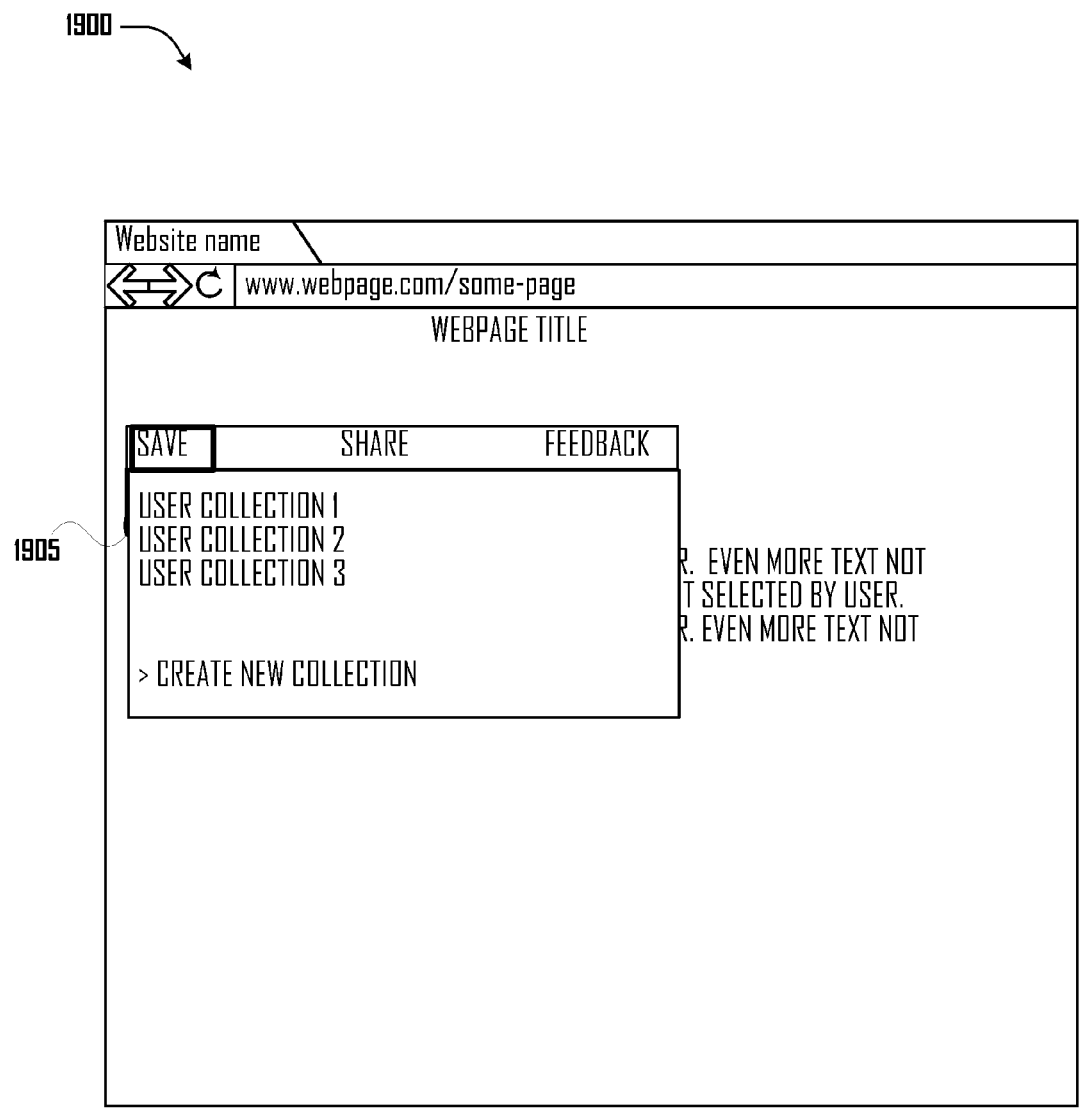
FIG. 19 is an illustration of an embodiment of a Client Device 400 interface generated by an embodiment of the disclosure, illustrating a webpage with a Selected Text Curl, presenting options for Curl Interaction with the Selected Text Curl, and illustrating an interaction with the "Save" option.
Figure 20:
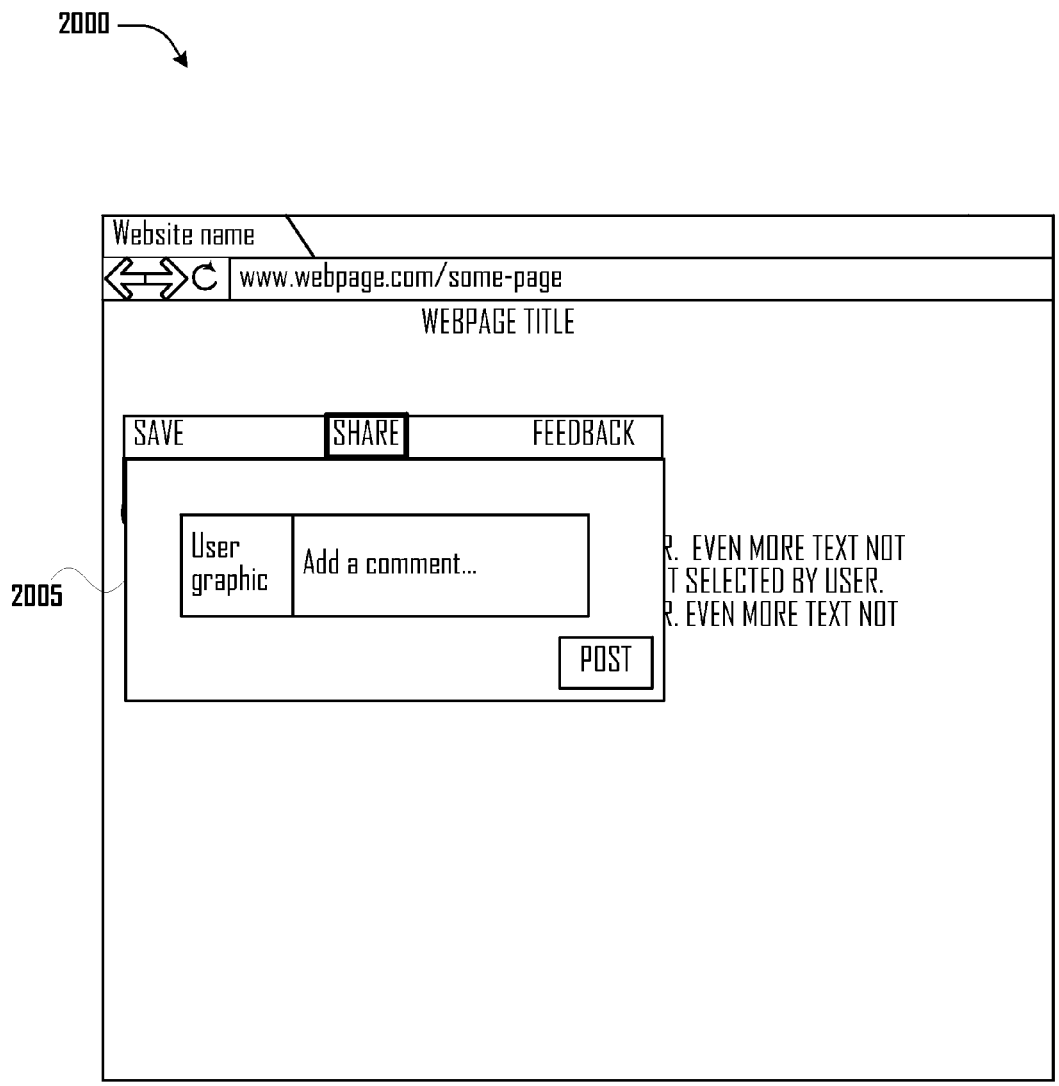
FIG. 20 is an illustration of an embodiment of a Client Device 400 interface generated by an embodiment of the disclosure, illustrating a webpage with a Selected Text Curl, presenting options for Curl Interactions with the Selected Text Curl, and illustrating an interaction with the "Share" option.

Generally, Curls are objects provided by the Butterfly App 315 within the context of the Client Browser 465 and the Webpage 320 rendered by the Client Browser 465. The Curls allow the Client Device 400 to engage in Curl Interactions. The Curl Interactions include a "Save" interaction, in which a screen-shot of a webpage is saved to the Butterfly Board 305 and/or the Archive Page 310, and a "Share" interaction. Sharing the webpage may result in posting a message regarding the webpage to a social network, such as Facebook, Google+, Twitter, or similar. The message regarding the webpage may comprise a link to the webpage, a link to one or more Butterfly Boards 305 and/or the Archive Page 310 where a screen-shot of the webpage was saved, and/or a screen-shot of the webpage in conjunction with a link to the webpage and/or a link to the Butterfly Board 305 and/or the Archive Page 310. The message regarding the webpage may further comprise text, audio, or video provided by the user. The Butterfly Server 200 may be configured to allow that users may login by providing login credentials specific to the Butterfly Server 200 and/or by providing login credentials for a social network. If logged-in via social network credentials, the Butterfly Server 200 may use such credentials to implement the "Share" Client Device 400 Curl Interaction. The Share and Save Curl Interactions are discussed further herein, particularly with respect to FIGS. 18, 19, and 20.

This paper discusses "Whole Page Curls," "Selected Text Curls," "Graphics Curls," "Video Curls," and "Paragraph Curls." Whole Page Curls may be provided in relation to whole webpages; Selected Text Curls may be provided in relation to selected text; Graphics Curls" may be provided in relation to selected graphics; Video Curls may be provided in relation to selected video; and Paragraph Curls may be provided in relation to selected html and other paragraphs. Curls may be "top-down," wherein the Curl graphic is placed at the top left-hand corner of the component or "bottom-up," wherein the Curl graphic is placed at the bottom right-hand corner of the component.

A Whole Page Curl is created when a webpage is first loaded and fades after a time, Y. The Whole Page Curl is re-created (for time Y) when a user mouse action approaches, for example, a top corner of the webpage. A Selected Text Curl is created when a user selects a text object within a webpage. A Graphics Curl is created when a user selects an image object or another graphical element within a webpage. A Video Curl is created when a user selects a video object within a webpage. A Paragraph Curl is created when a user selects a paragraph object within a webpage. All of the Curls may fade after time Y (similar to a Whole Page Curl) or may persist until another portion of the webpage is selected. Identification of these objects within a webpage is discussed further herein in FIGS. 8, 9A, and 9B.

Figure 2:
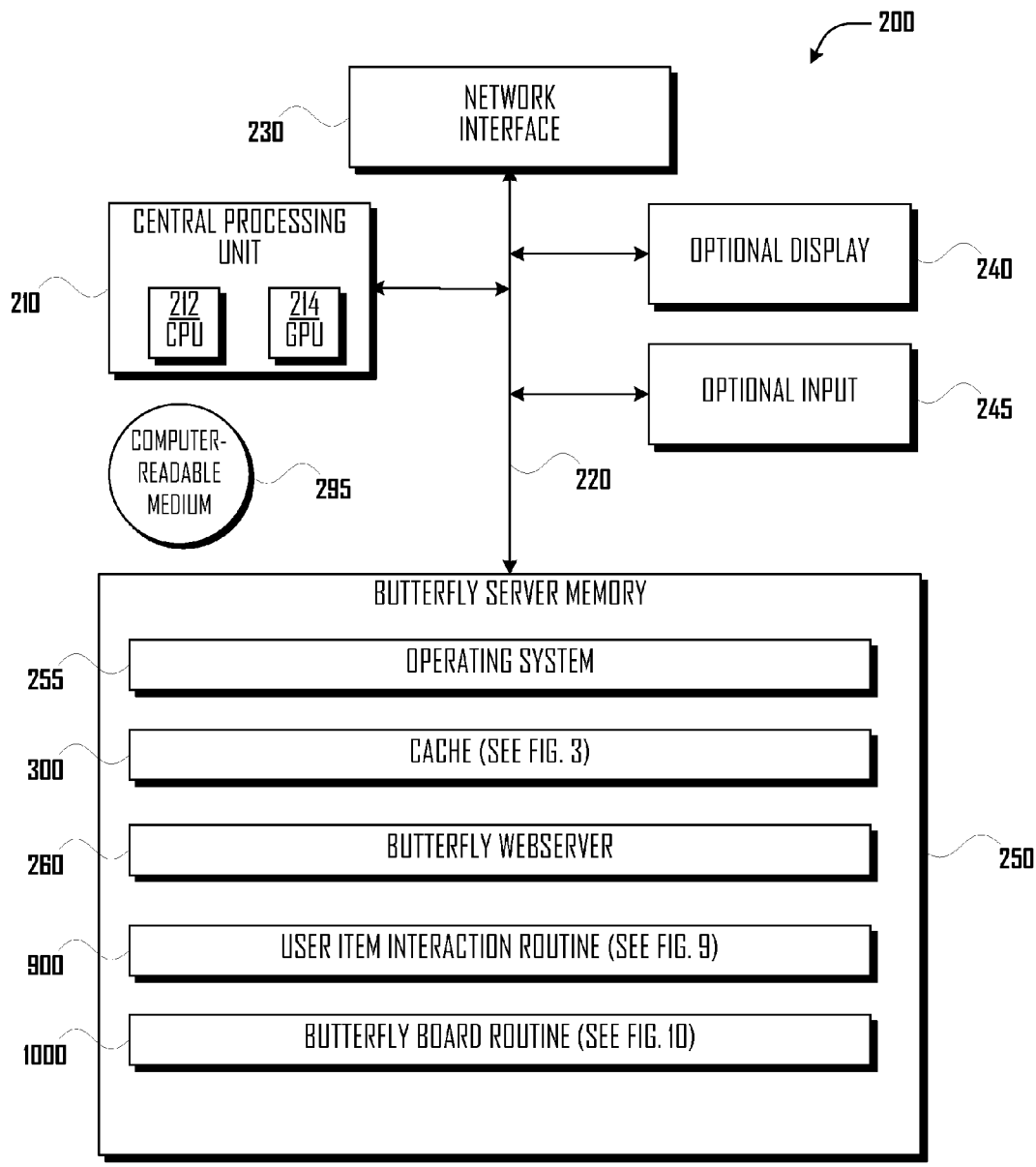
FIG. 2 is a functional block diagram of an exemplary Butterfly Server computing device and some data structures and/or components thereof.

FIG. 2 is a functional block diagram of an exemplary Butterfly Server computing device and some data structures and/or components thereof. The Butterfly Server 200 in FIG. 2 comprises at least one Processing Unit 210, Butterfly Server Memory 250, a Display 240 and Input 245, all interconnected along with the Network Interface 230 via a Bus 220. The Processing Unit 210 may comprise one or more general-purpose Central Processing Units ("CPU") 212 as well as one or more special-purpose Graphics Processing Units ("GPU") 214. The components of the Processing Unit 210 may be utilized by the Operating System 255 for different functions required by the routines executed by the Butterfly Server. The Network Interface 230 may be utilized to form connections with the Network 190 or to form device-to-device connections with other computers.

The Butterfly Server Memory 250 generally comprises a random access memory ("RAM"), a read only memory ("ROM"), and a permanent mass storage device, such as a disk drive or SDRAM (synchronous dynamic random-access memory). The Butterfly Server Memory 250 stores program code for software routines, such as, for example, the Butterfly Webserver 260, the User Item Interaction Routine 900, and the Butterfly Board Routine 1000, as well as, for example, browser, email client and server routines, client applications, and database applications (discussed further below). Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, the Butterfly Server Memory 250 also stores an Operating System 255. These software components may be loaded from a non-transient Computer Readable Storage Medium 295 into Butterfly Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supporting input modalities, Input 245, such as, for example, a touchscreen, a camera, a keyboard, a mouse, a trackball, a stylus, motion detectors, and a microphone. The Input 245 may also serve as a Display 240, as in the case of a touchscreen display which also serves as Input 245, and which may respond to input in the form of contact by a finger or stylus with the surface of the Input 245.

Figure 3:
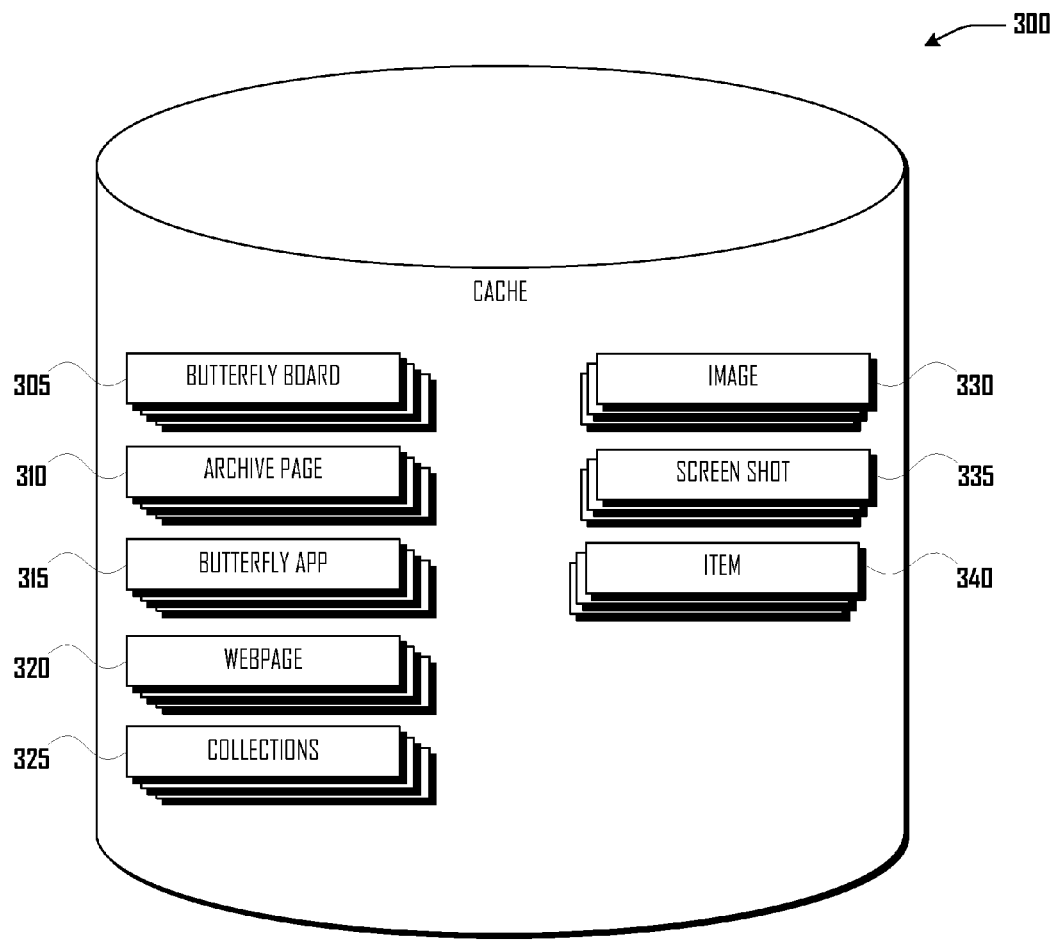
FIG. 3 is a functional block diagram of the Butterfly Server Datastore illustrated in the computing device of FIG. 2.

The computing device 200 may also comprise or communicate via Bus 220 with the Butterfly Server Datastore 300, illustrated further in FIG. 3. In various embodiments, Bus 220 may comprise a storage area network ("SAN"), a high speed serial bus, and/or via other suitable communication technology. In some embodiments, the Butterfly Server 200 may communicate with the Butterfly Server Datastore 300 via Network Interface 230. The Butterfly Server 200 may, in some embodiments, include many more components than those shown in this Figure. However, it is not necessary that all of these generally conventional components be shown in order to disclose an illustrative embodiment.

FIG. 3 is a functional block diagram of the Butterfly Server Datastore illustrated in the computing device of FIG. 2. The components of the Butterfly Server Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
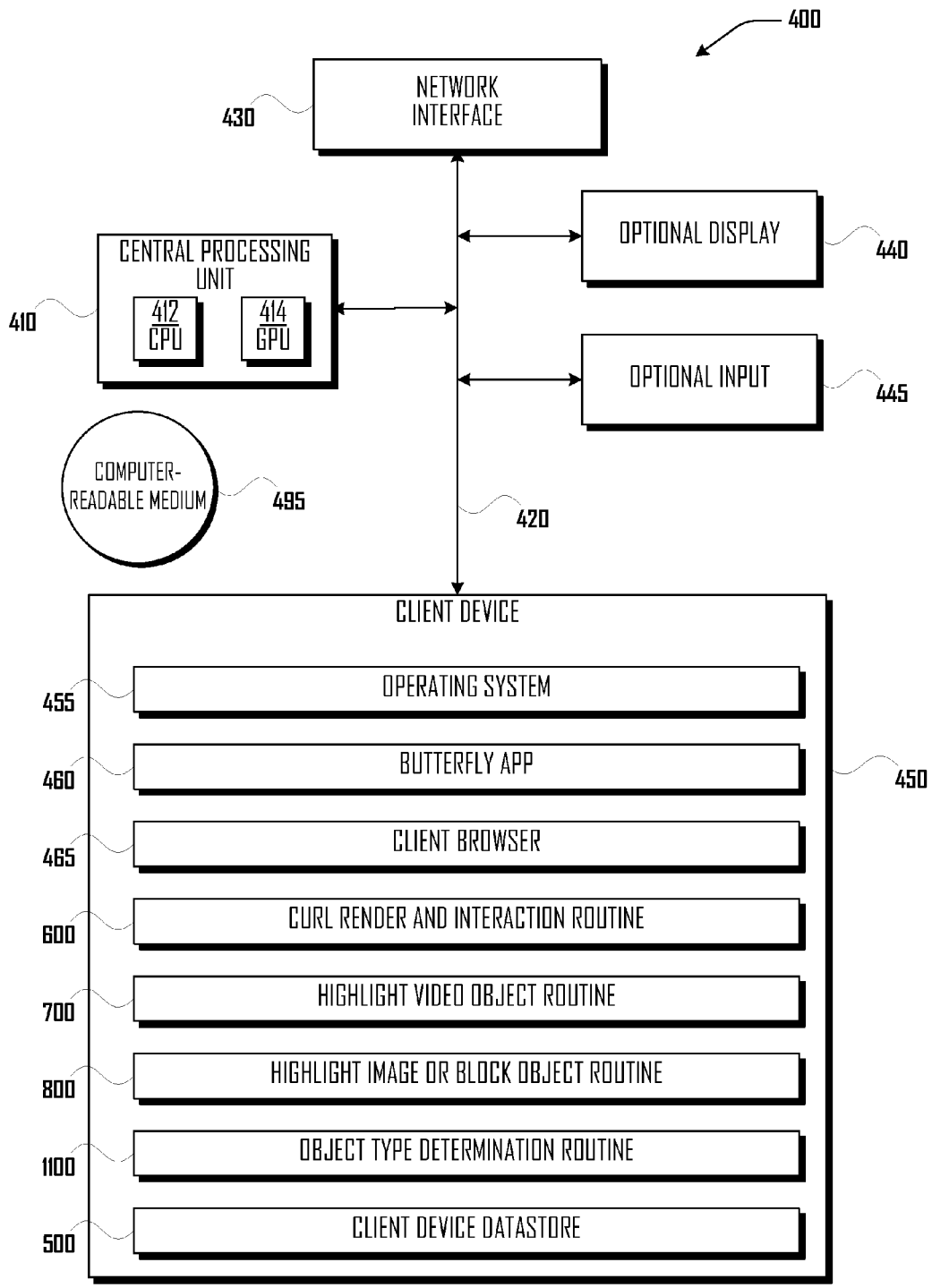
FIG. 4 is a functional block diagram of an exemplary Client Device computing device and some data structures and/or components thereof.

FIG. 4 is a functional block diagram of an exemplary Client Device computing device and some data structures and/or components thereof. The Client Device 400 in FIG. 4 comprises at least one Processing Unit 410, Client Device Memory 450, a Display 440 and Input 445, all interconnected along with the Network Interface 430 via a Bus 420. The Processing Unit 410 may comprise one or more general-purpose Central Processing Units ("CPU") 412 as well as one or more special-purpose Graphics Processing Units ("GPU") 414. The components of the Processing Unit 410 may be utilized by the Operating System 455 for different functions required by the routines executed by the Client Device 400. The Network Interface 430 may be utilized to form connections with the Network 190 or to form device-to-device connections with other computers. The Client Device Memory 450 generally comprises a random access memory ("RAM"), a read only memory ("ROM"), and a permanent mass storage device, such as a disk drive or SDRAM (synchronous dynamic random-access memory).

The Client Device Memory 450 stores program code for software routines, such as, for example, a Curl Render and Interaction Routine 600, an Object Type Determination Routine 1100, Highlight Video Object Routine 700, and a Highlight Image or Block Object Routine 800, as well as, for example, browser, email client and server routines, client applications, and database applications (discussed further below). Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, the Client Device Memory 450 also stores an Operating System 455. These software components may be loaded from a non-transient Computer Readable Storage Medium 495 into Client Device Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 430).

The Client Device 400 may also comprise hardware supporting input modalities, Input 445, such as, for example, a touchscreen, a camera, a keyboard, a mouse, a trackball, a stylus, motion detectors, and a microphone. The Input 445 may also serve as a Display 440, as in the case of a touchscreen display which also serves as Input 445, and which may respond to input in the form of contact by a finger or stylus with the surface of the Input 445.

Figure 5:
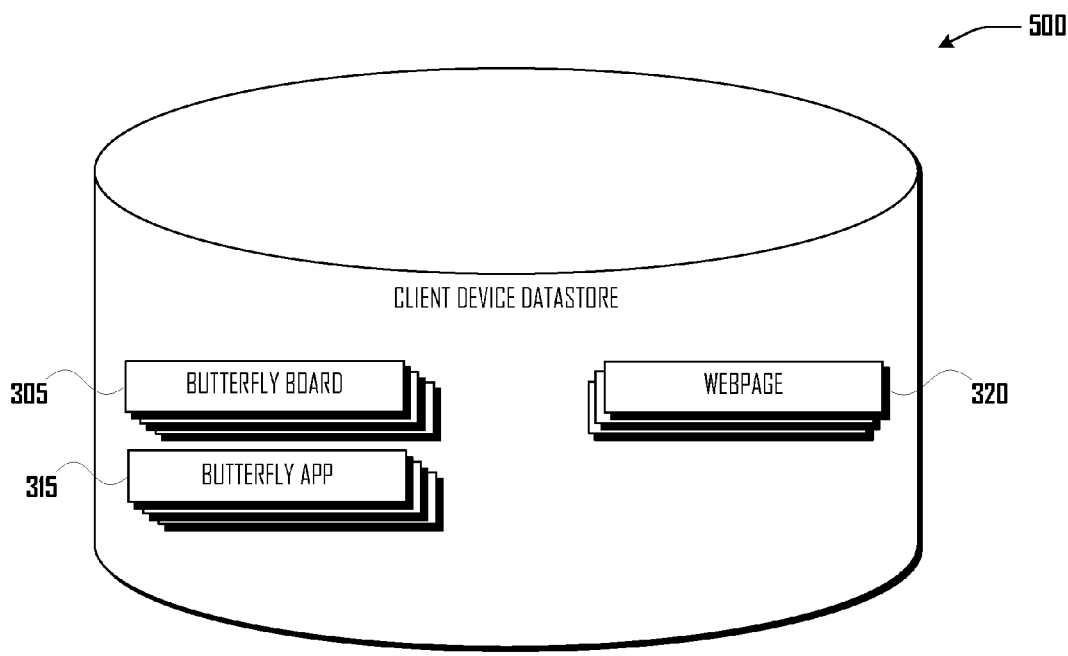
FIG. 5 is a functional block diagram of the Client Device Datastore illustrated in the computing device of FIG. 4.

The Client Device 400 may also comprise or communicate via Bus 420 with Client Device Datastore 500, illustrated further in FIG. 5. In various embodiments, Bus 420 may comprise a storage area network ("SAN"), a high speed serial bus, and/or via other suitable communication technology. In some embodiments, the Client Device 400 may communicate with the Client Device Datastore 500 via Network Interface 430. The Client Device 400 may, in some embodiments, include many more components than those shown in this Figure. However, it is not necessary that all of these generally conventional components be shown in order to disclose an illustrative embodiment.

FIG. 5 is a functional block diagram of the Client Device Datastore illustrated in the computing device of FIG. 4. The components of the Client Device Datastore 500 are data groups used by routines and are discussed further herein in the discussion of other of the Figures.

The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6:
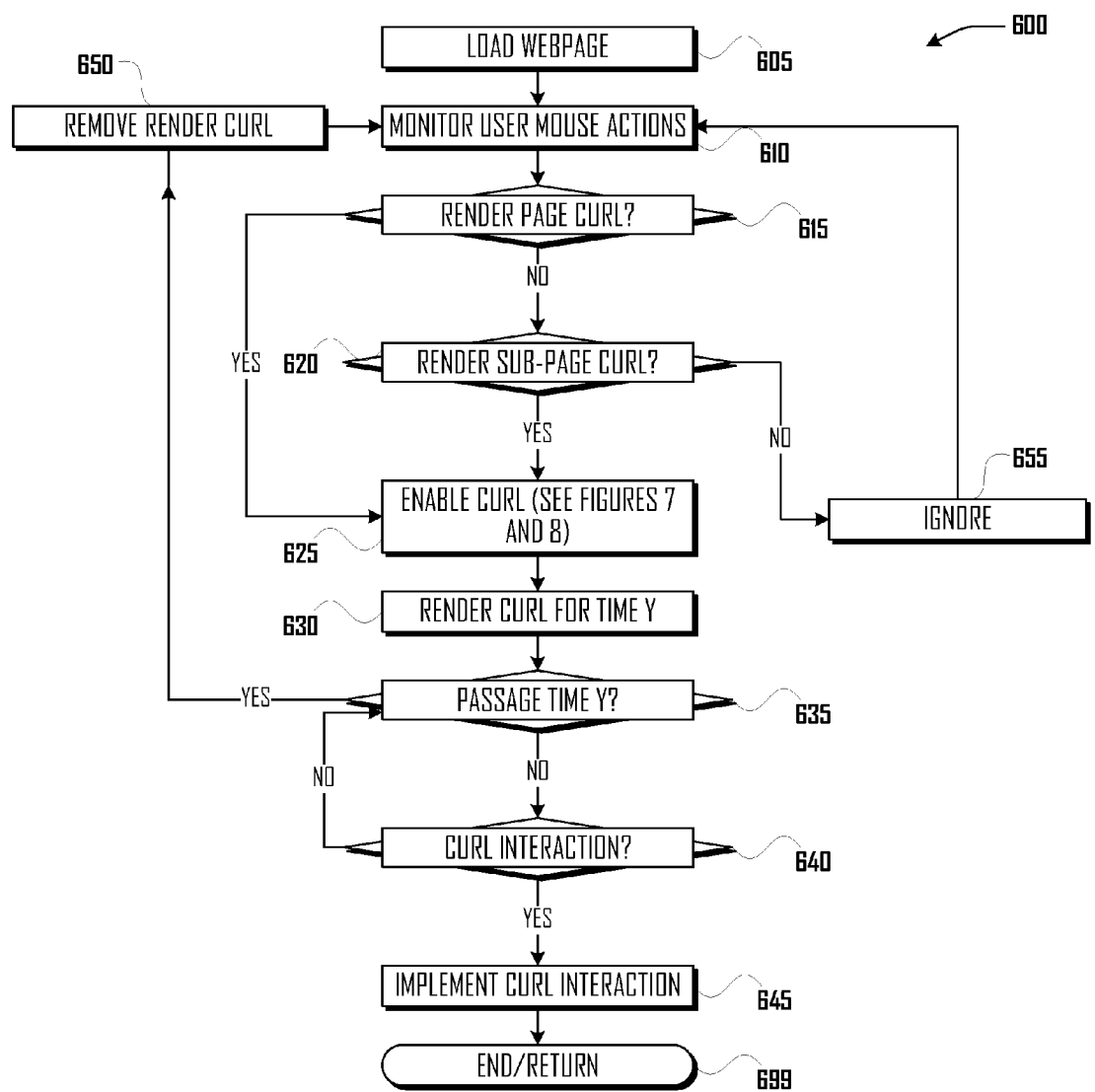
FIG. 6 is a flowchart illustrating an embodiment of a Curl Render and Interaction Routine 600 performed in a Client Device 400.

FIG. 6 is a flowchart illustrating an embodiment of a Curl Render and Interaction Routine 600 performed in a Client Device 400. In this Routine, a client browser, such as Client Browser 465, draws a Curl and activates it as an object. Prior to the steps shown in the flowchart in FIG. 6, a user has downloaded (such as from the Butterfly Server 200) and installed the Butterfly App 315. Activation of the Butterfly App 315 may require that the user has also logged into the Butterfly Server 200, such as by providing login credentials (as discussed elsewhere).

At box 605, the Client Browser 465 and the Curl Render and Interaction Routine 600 has loaded a webpage, such as Webpage 320. At box 610, the Curl Render and Interaction Routine 600 monitors the user mouse actions. "Mouse action," should be understood as any user interaction, whether from a mouse, a keyboard, a touch interface, a speech command, an eye tracker, or a motion sensing interaction (such as are provided by Microsoft's KINECT®), which may be substituted for a "mouse action."

At box 615, a determination may be made regarding whether a Whole Page Curl is to be rendered. For example, a Whole Page Curl may be rendered the first time the webpage is loaded (regardless of a user mouse action) and, thereafter if the user mouse action approaches the corner of the webpage where the Whole Page Curl was previously rendered.

At box 620 (which may proceed from box 615, even if the determination was to render a Whole Page Curl), a determination may be made, based on the user mouse action, whether a "Sub-Page Curl" should be rendered. Examples of Sub-Page Curls comprise Selected Text Curls, Graphics Curls, Video Curls, and Paragraph Curls. The criteria for mouse actions triggering these Curl types is discussed elsewhere in this paper.

At box 625 the Sub-Page Curl is enabled and, at box 630, rendered at step 630 (steps 625 and 630 may be reversed in order or may proceed simultaneously). Enabling the Sub-Page Curl generally involves execution of the Highlight Video Object Routine 700 and/or the Highlight Image or Block Object Routine 800, discussed further in relation to FIGS. 7 and 8.

At box 635 the Curl Render and Interaction Routine 600 may determine whether a time Y has elapsed. If time Y has elapsed, then at box 650, the rendered Curl may be removed (as discussed elsewhere, this may involve playing or rendering an animation or another transitional signal to the user that the Curl is being removed) and the process may return to monitoring user mouse actions at box 610. Certain Curl types, such as Sub-Page Curls, may or may not have a timer on the Curl; these types of Curls may persist until another selection on the webpage occurs.

If time Y has not elapsed, then at box 640 the Curl Render and Interaction Routine 600 may determine whether there has been a Curl Interaction, such as a Save or Share Curl Interaction (discussed at greater length elsewhere). This determination may allow for the passage of a period of time or this determination may watch for a user interaction, such as clicking on the rendered Curl. If there has not been a user interaction, then process may return to box 635.

If there was a Curl Interaction, then at box 645 the Curl Interaction may be implemented, which may involve communication with the Butterfly Server 200 and execution of the User Item Interaction Routine 900.

FIG. 7 is a flowchart illustrating an embodiment of a Highlight Video Object Routine 700 performed in a Client Device 400. This subroutine is generally performed within box 625 and/or 630 of FIG. 6 and is used to determine the portion of the webpage to which a Curl is to be applied. FIGS. 7 and 8 are identical through boxes 715 and 815 (705 is the same as 805; 710 is the same as 810; 715 is the same as 815).

At box 705, a client mouseenter event is detected by the Highlight Video Object Routine 700 (observing the Client Browser 465), which may be part of the Bufferfly App 315.

At box 710, a determination is made regarding whether the clientmousemove event relates to a new element. If yes, then a determination is made at box 715 whether the target of the client mousemove event is an IFRAME or an embedded object element. If not, then at box 716, the Highlight Video Object Routine 700 may goto box 820 (switching to the Highlight Image or Block Object Routine 800).

At box 720, the event target's element type is obtained by the Butterfly App 315 and found to be a video element. At box 725, the video handler objects (from software routines executed by the Client Device 400 and accessible by the Client Browser 465 to render video) corresponding to the element type are obtained. At box 730 the event target's parameter is passed to the video handler objects.

At box 735, a determination is made regarding whether the video handler objects accept or match the parameter. If not, then at box 760 the event is ignored. If yes, then at step 740 a determination is made regarding whether the match is with an Adobe® FLASH® video handler. If yes, then at step 745, the event target's embedded code is re-written to set 'wmode' to 'opaque,' so that layers, such as the video Curl, can be added above the element. If no at decision box 740 and after box 745, then at box 750 the event target is passed to the "make highlight" method for the matching video handler object. The "make highlight" method creates a video Curl object which is compatible with the video element. At step 755, a "video highlight object" or video Curl is returned to the Client Browser 465 and the process returns to FIG. 6 and box 625.

Figure 8A:
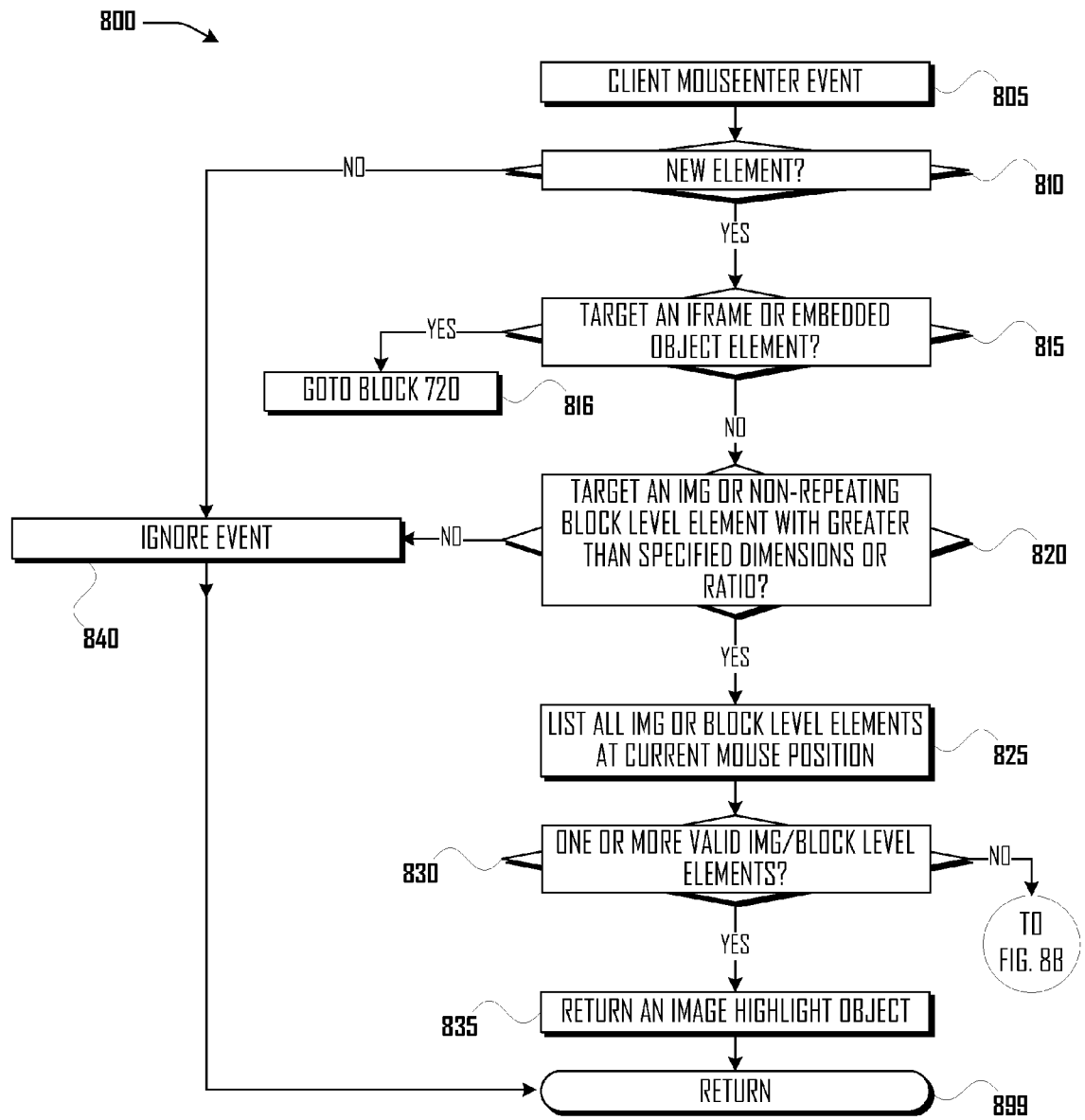
FIGS. 8A and 8B are flowcharts illustrating an embodiment of a Highlight Image or Block Object Routine 800 performed in a Client Device 400.
Figure 8B:
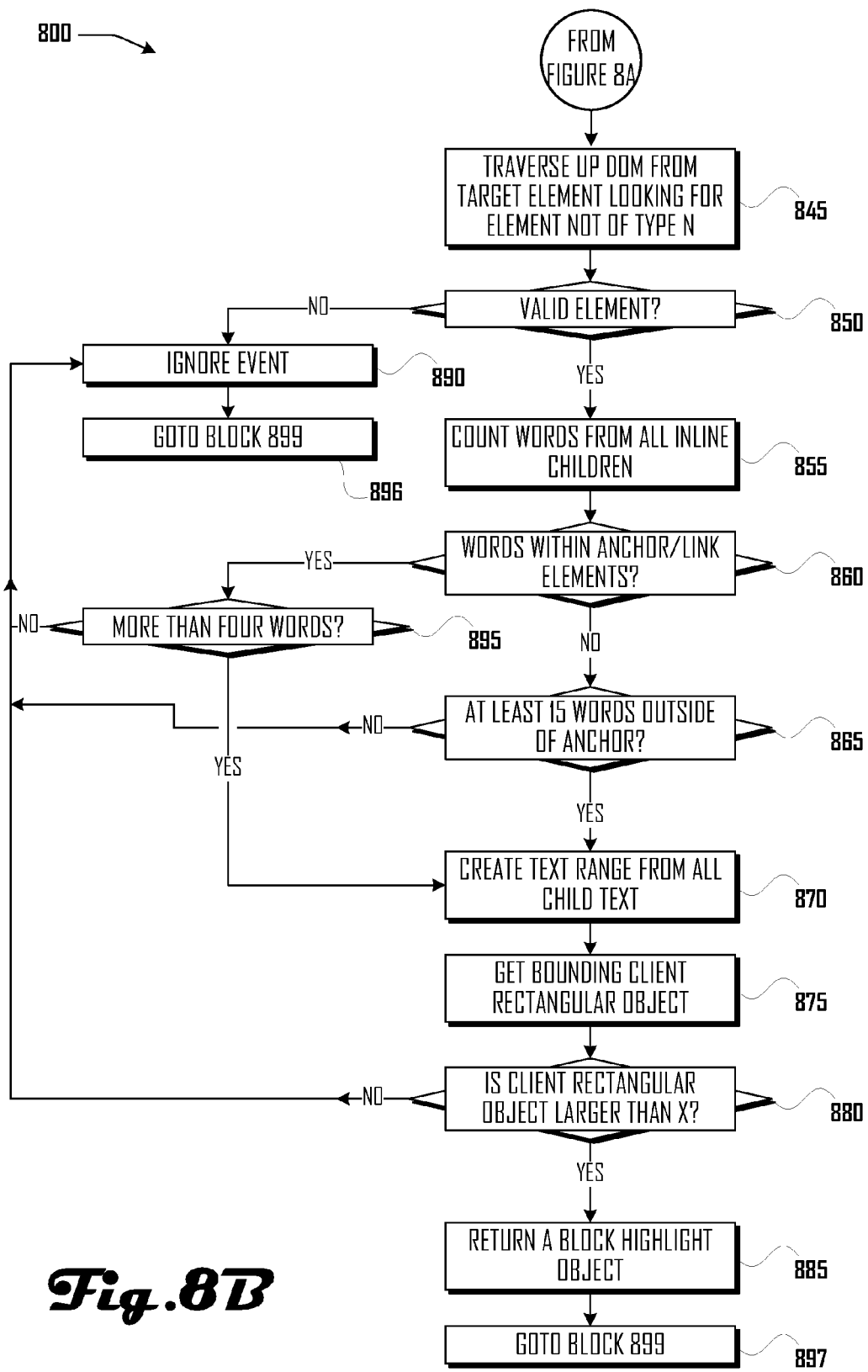

FIGS. 8A and 8B are flowcharts illustrating an embodiment of a Highlight Image or Block Object Routine 800 performed in a Client Device 400. This subroutine is generally performed within box 625 and/or 630 of FIG. 6 and is used to determine the portion of the webpage to which a Curl is to be applied. As noted above, FIGS. 7 and 8 are identical through boxes 715 and 815 (705 is the same as 805; 710 is the same as 810; 715 is the same as 815). The Highlight Video Object Routine 700 and the Highlight Image or Block Object Routine 800 may be considered the same routine up through boxes 715 and 815.

At box 805 a clientmousemove event is detected by the Highlight Image or Block Object Routine 800 (observing the Client Browser 465), which may be part of the Bufferfly App 315. At box 810, a determination is made regarding whether the clientmousemove event relates to a new element. If yes, then a determination is made at box 815 whether the target of the client mousemove event is an IFRAME or an embedded object element. If yes at box 815, then at box 816, the Highlight Image or Block Object Routine 800 may goto box 720 (switching to the Highlight Video Object Routine 700).

If no at box 815, then at box 820 a determination is made regarding whether the target is an IMG (html or similar element used to place an image) or a non-repeating block level element with greater than minimum specified dimensions, which minimum specified dimensions are selected to eliminate non-viewable images, such as a minimum of 60 pixels by 60 pixels, and/or a width to height ratio of no more than 6:1 and no less than 1:6. If yes, then at box 825 a list is generated or obtained of all IMG or block level elements at the current mouse position.

At box 830, a determination is made regarding whether there is one or more valid IMG or block level element in the list generated at box 825. If yes at box 830 or at box 820, then at box 835, an image highlight object is returned and passed to the Client Browser 465, allowing the Butterfly App 315 to use the Client Browser 465 to draw a Graphics Curl around an image object in a webpage. The process may then return at box 899.

If, at box 830 no valid IMG or block level elements were found, then at box 845, the Highlight Image or Block Object Routine 800 traverses up the DOM ("Document Object Model") for the Webpage 320, looking for elements not of type n, where n are BODY, FORM, BUTTON, LABEL, HTML, TEXTAREA, INPUT, SELECT, UL, OL, TABLE, TBODY, THEAD, TR, TH, STYLE, SCRIPT, NONSCRIPT, CITE, AREA.

At box 850, a determination is made regarding whether a valid element not of type n is found. If yes, then at box 855, the words in all inline children for the valid element are counted. At step 860, an optional determination is made regarding whether there are words (from the word count in step 855) within hyperlink anchors (to exclude hyperlinks from becoming Curls, if that is desired). If no, then at box 895, a determination is made regarding whether there are more than four words (to exclude very short phrases from being Text Curls, if that is desired; a different threshold other than four may be selected). If yes at box 860, then at box 865 a determination is made regarding whether there are at least 15 words outside of hyperlink anchors (to exclude phrases which do not include enough non-hyperlink words, if that is desired; a different threshold other than 15 may be selected). If yes at box 895 or at box 865, then at box 870 a text range is created for all the inline child text. At step 875 a bounding rectangular object for the text range is obtained. At step 880, a determination is made regarding whether the bounding rectangular object is larger than X, where X is 20 pixels or more in height (to exclude Curls on text objects which are too small, if desired; a different threshold other than 20 pixels may be selected).

At box 885 a block highlight object is returned and passed to the Client Browser 465, allowing the Butterfly App 315 through the Curl Render and Interaction Routine 600 to use the Client Browser 465 to draw a text Curl around selected text in a webpage.

Figure 9A:
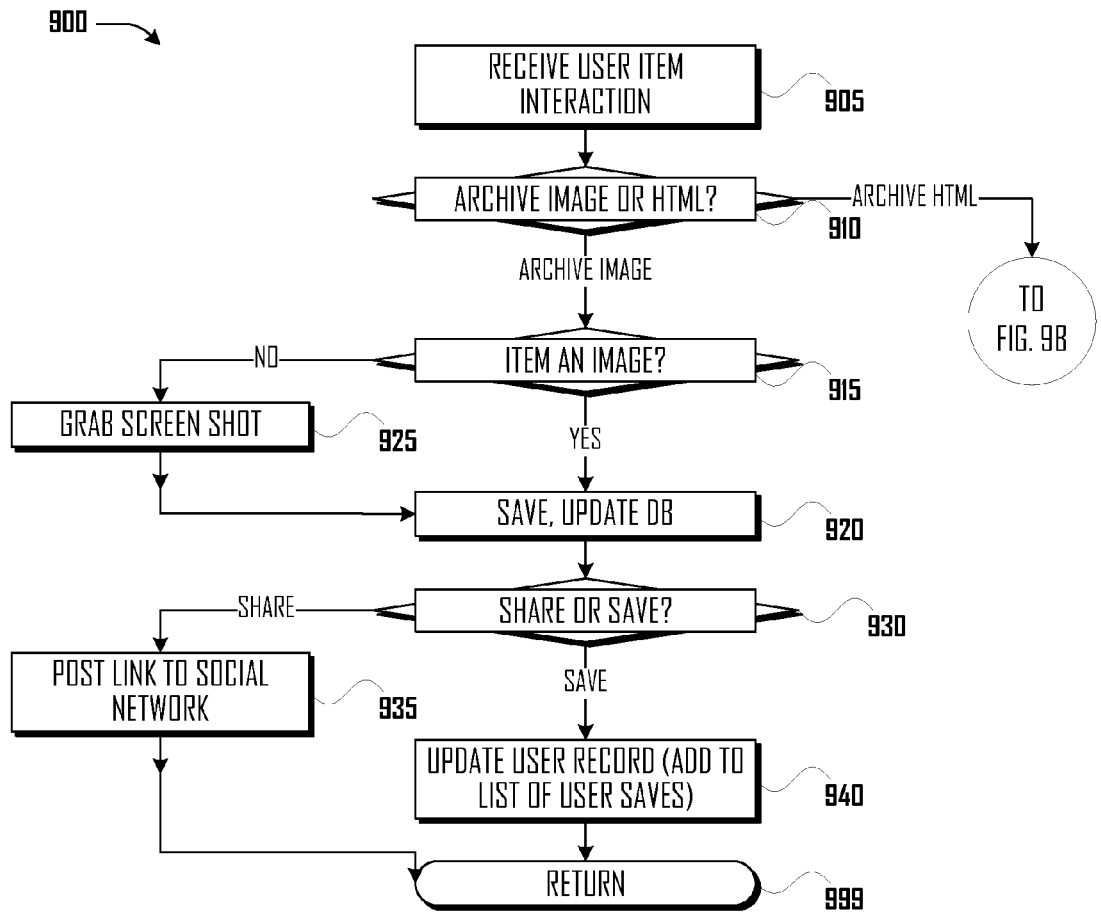
FIGS. 9A and 9B are flowcharts illustrating an embodiment of a User Item Interaction Routine 900 performed in a Butterfly Server 200.
Figure 9B:
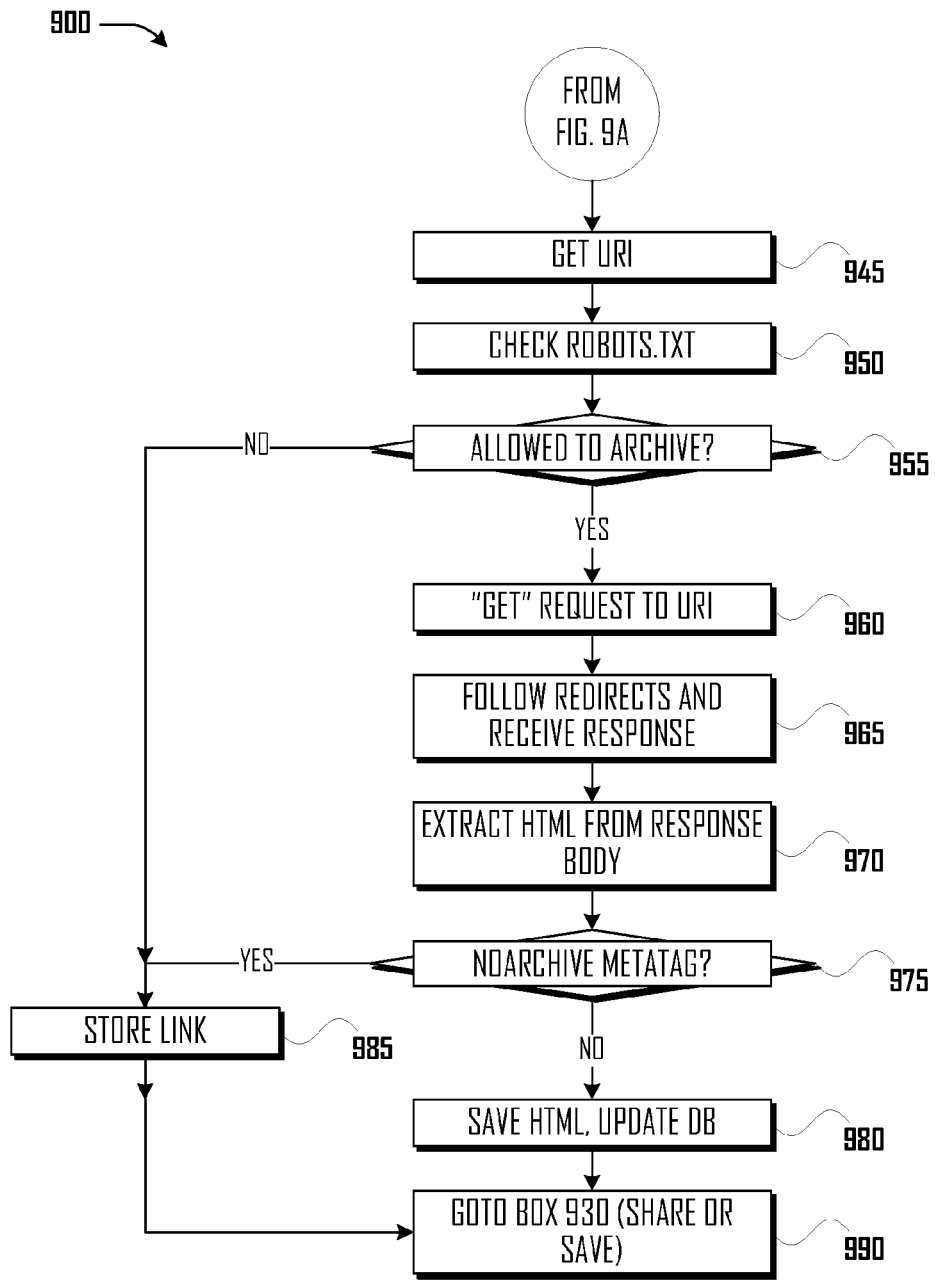

FIGS. 9A and 9B are flowcharts illustrating an embodiment of a User Item Interaction Routine 900 performed in a Butterfly Server 200. Prior to the execution of this routine, a user interacted with a Curl, via the Client Browser 465 and the Butterfly App 315, and transmitted instructions to the Butterfly Server 200. This process may begin, for example, after step 645 in FIG. 6.

At box 905, the User Item Interaction Routine 900 receives a Curl Interaction from, for example, the Butterfly App 315 via the Client Browser 465. The Curl Interaction may transmitted to the User Item Interaction Routine 900 including a URI identifying the location for where to obtain the Webpage 320, the type of object with which the Curl Interaction relates (such as a Video Highlight Object of box 755, an Image Highlight Object of box 835, or a Block Highlight Object of box 885), the location of the object in the Webpage 320, and the type of Curl Interaction, such as a "Share" or "Save."

At box 910, instructions are added to a job queue (or similar) to "archive image" and to "archive html;" this job queue is illustrated herein by decision box 910. The instructions may be issued by the Butterfly App 315.

For "archive image," the process proceeds to decision box 915, where a determination is made regarding whether the Curl Interaction is with or in relation to an Item which is an image, such as a jpeg, gif, tiff, or similar. As used herein, an "Item" is an object with which the user interacted using the Butterfly App 315; Items are found in webpages; Items may be text which the user selects, a whole-page (or whole-webpage), a paragraph within a webpage, images, or video; content which receive Curls (defined herein) become Items after the user interacts with the Curls.

If the Curl Interaction is with or in relation to an Item which is an image, then at box 920 the image or a link thereto is saved (which may involve transcoding and/or down-sampling the saved image), such as to the Cache 300 and record Image 330, and a database servicing the Butterfly Board for the user (which database may be the Cache 300 or a database which is otherwise accessible by the Butterfly Server) is updated to associate the saved image location and the user so that the saved Item may be loaded on the user's Butterfly Board 305 and/or to an Archive Page 310.

If the Item was not an image, such as if the Item was text, then at box 925, a screen-shot of the Item is prepared (such as by the Butterfly Server 200) which screen-shot is then, at step 920, sent to and saved in a repository, such as the Cache 300, such as in the Screen Shot 335 record. The screen-shot may not be an exact visual representation of the Item, but may be text converted to an image (absent surrounding material on the webpage) or may simply be selected text, not in an image format. A database servicing the Butterfly Board for the user, such as Cache 300, is updated to associate the saved screen-shot and the user so that the saved Item may be loaded on the user's Butterfly Board 305 and/or on a Archive Page 310.

At step 930 a determination is made regarding whether the Curl Interaction was a Share or Save Curl Interaction. If the Curl Interaction was a Share, then at step 935 a link is posted to the social network (posting to the social network is also discussed above). The posted link may provide access to the Archive Page 310 (examples of Archive Pages 310 are found in FIGS. 17 and 21 and are discussed further herein).

If the Curl Interaction was a Save, then at box 940, user records, such as in a database, including the Cache 300 or a database serving the Butterfly Server 200 (discussed above) are updated to add the saved Item to the Items saved by the user, which list of Items may be accessed by the user through the user's Butterfly Board 305.

Turning to FIG. 9B, at box 945 the URL (such as IP address, domain name, or similar) for the webpage containing the Item is obtained by the Butterfly App and sent to the Butterfly Server 200. The Butterfly Server 200 uses the URL to check at step 950 whether the webserver, such as Webserver 110, publishes a <robots.txt> file in relation to the webpage 320 (or a website with which the webpage 320 is associated). If there is a <robots.txt> file, then at box 955 the <robots.txt> file is checked to determine whether the Butterfly service is allowed to archive the webpage. If the Butterfly service is allowed to archive the webpage, then at box 960 the Butterfly Server 200, such as using the Butterfly Webserver 260, issues a "get" request to the URL. At box 965, URL redirects are followed and a response is received. At step 7212 HTML is extracted from the response body. At box 975, a decision is made regarding whether there is a "NOARCHIVE" metatag (meaning that the HTML should not be archived). If no "NOARCHIVE" metatag is found, then at box 980, the HTML is saved and a database updated. The database may be the Cache 300 and/or a database servicing the Butterfly Server and/or Butterfly Board for the user. Following boxes 980 and 965, the process proceeds to box 930 (discussed elsewhere).

Figure 10:
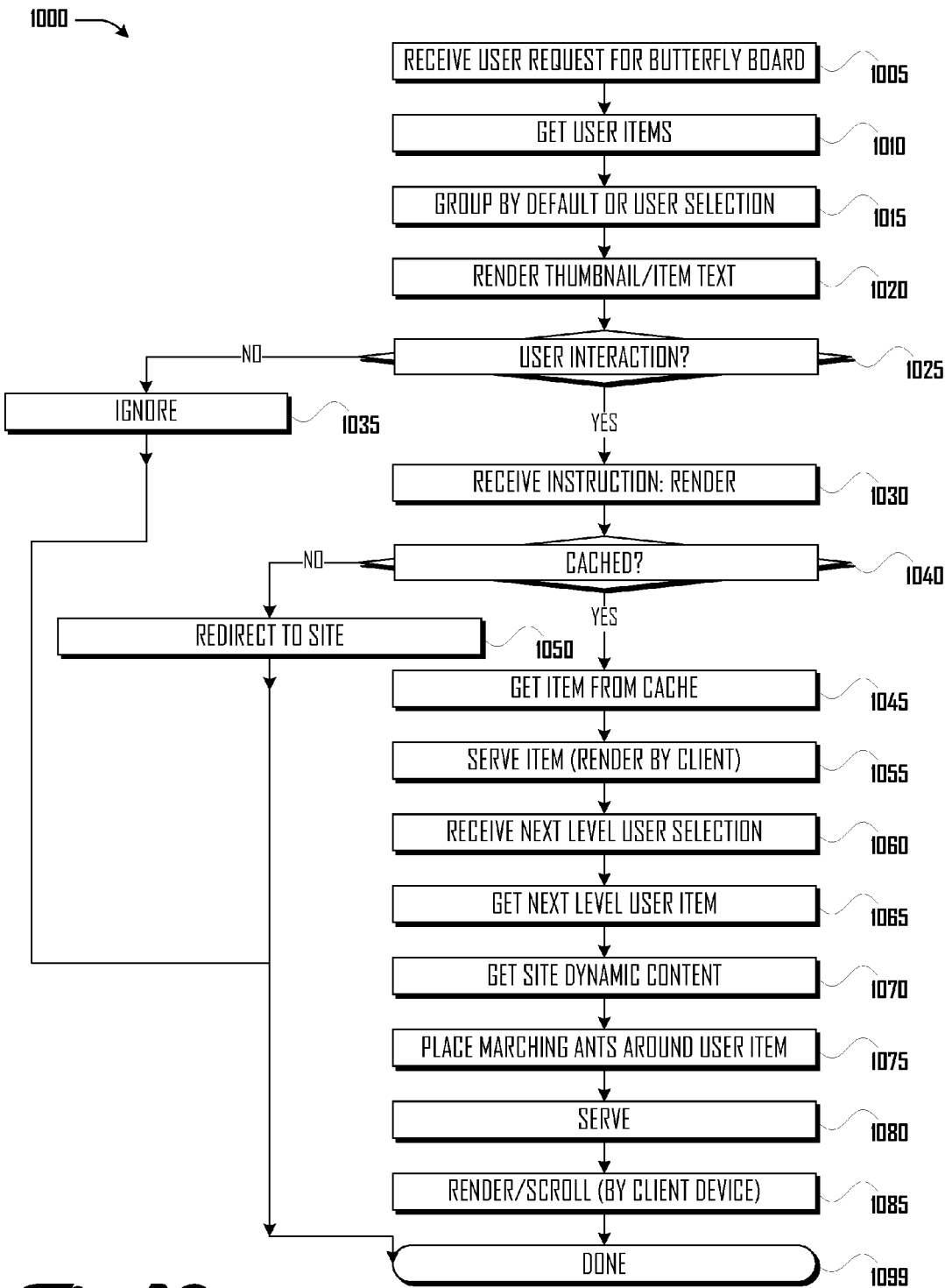
FIG. 10 is a flowchart illustrating an embodiment of a Butterfly Board Routine 1000 performed in a Butterfly Server 200.

FIG. 10 is a flowchart illustrating an embodiment of a Butterfly Board Routine 1000 performed in a Butterfly Server 200. In this routine, a client browser interacts with the Butterfly Server and the Butterfly Server serves a Butterfly Board.

At box 1005, the Butterfly Server 200, such as through the Butterfly Webserver 260, receives a user request for the Butterfly Board associated with the user, Butterfly Board 305. The request may be a URL "get" command, or similar, issued by the Client Browser 465, potentially in conjunction with or under the direction of the Butterfly App 104. The request may include data (including encrypted data) to identify the user and may include login credentials for the user. Not shown, the user login credentials may be verified against a social network.

At box 1010, the Butterfly Server 200 obtains the Items associated with the user and which are meant to be viewed on the user's Butterfly Board 305. At box 1015, the user Items are grouped in the default grouping or, in an embodiment, the user may select a grouping. The user grouping selection is shown as element 1415 in FIG. 14, which element, when clicked, may show alternatives such as "group by Collection," "group by date," "group by site," and "show all." As discussed elsewhere, Collections may be categories assigned by the user to Items.

At box 1020 the Items comprising the user's Butterfly Board 305 are obtained by the Butterfly Server 200 and composed in the format of the Butterfly Board 305 (which steps may be performed by the Butterfly Webserver 260), served to the Client Device 400 as the user's Butterfly Board 305, and rendered in the Client Browser 465.

At box 1025, a determination is made by the Butterfly Server 200, such as using the Butterfly Webserver 260, whether there was a Curl Interaction with the Butterfly Board 305, such as selecting an Item to be rendered. Using the example shown in FIG. 14, an Item is element 1420, generated from a "Save" interaction with the Selected Text Curl show in FIG. 18 as element 1805. The Curl Interaction in this example would be clicking on the Item represented by element 1420. If there was, then at box 1030, a determination is made regarding whether the Item is cached, such as in Cache 300, as Item 340.

Figure 21:
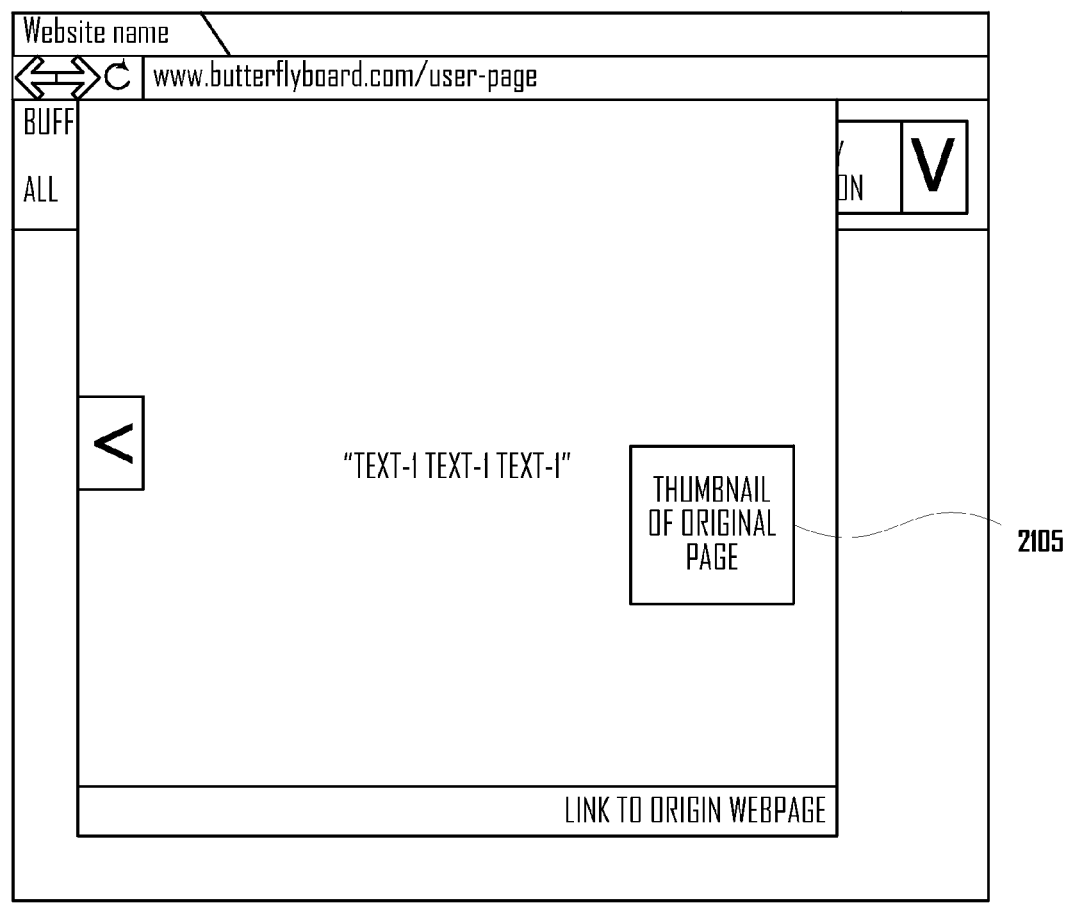
FIG. 21 is an illustration of an embodiment of a Butterfly Board interface and Archived Text generated by an embodiment of the disclosure.

If the Item was cached, then at box 1045 the cache of the Item is obtained and at box 1055, the cached Items are served to and rendered by the Client Browser 465. FIG. 21 and element 21000 depicts the result of obtaining the cache of element 1420. As shown in FIG. 21, the cached Items associated with element 1420 include the selected text, "TEXT-1 TEXT-1 TEXT-1" and a thumbnail of the page on which the text was selected, element 2105.

At box 1060, the user has selected (clicked on) the cached Items, such as element 1605, and the Butterfly Server 200, such as at the Butterfly Webserver 260, has received the user selection.

At box 1065, the Butterfly Server 200, such as using the Butterfly Webserver 260, gets the next level of the user's selection, which in this case is the webpage found at the webpage URL. At box 1070 the Butterfly Server 200, such as using the Butterfly Webserver 260, gets dynamic content for the webpage, such as advertisements, and then at box 1075, places "marching ants" or a similar graphic around (or in front of) the selected text (element 1805). "Marching ants" may comprise, for example, a graphical frame, such as a box or set of lines, which box or lines are broken and which broken lines appear to move along the perimeter of the box or set of lines. The "marching ants" is discussed elsewhere in this paper. Then at box 1080, the Butterfly Server 200, such as using the Butterfly Webserver 260, delivers the webpage to the Client Browser 465, including with the marching ants.

Figure 12:
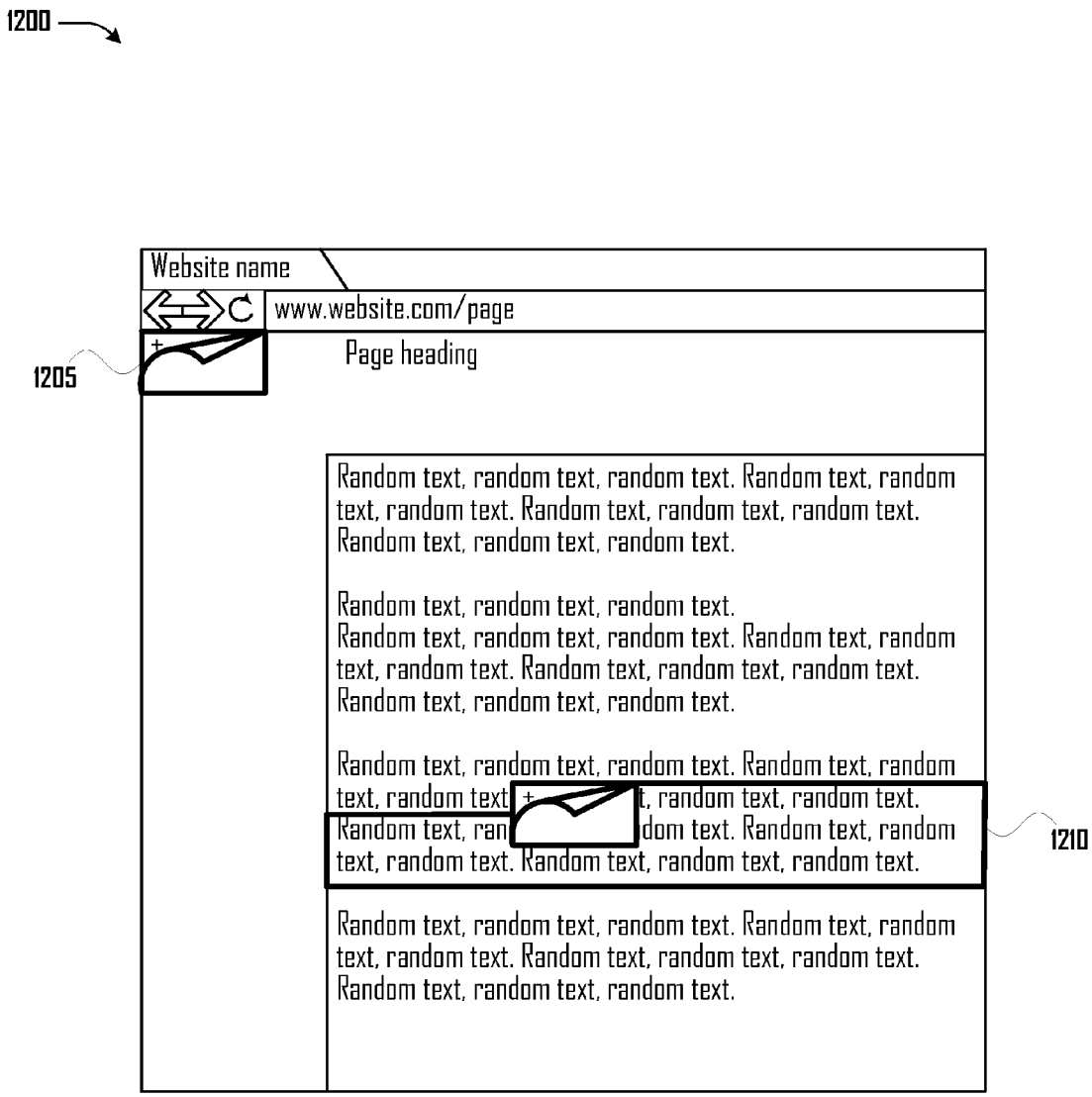
FIG. 12 is an illustration of an embodiment of a Client Device 400 interface generated by an embodiment of the disclosure, illustrating a webpage with a Whole Page Curl and a Selected Text Curl.
Figure 15:
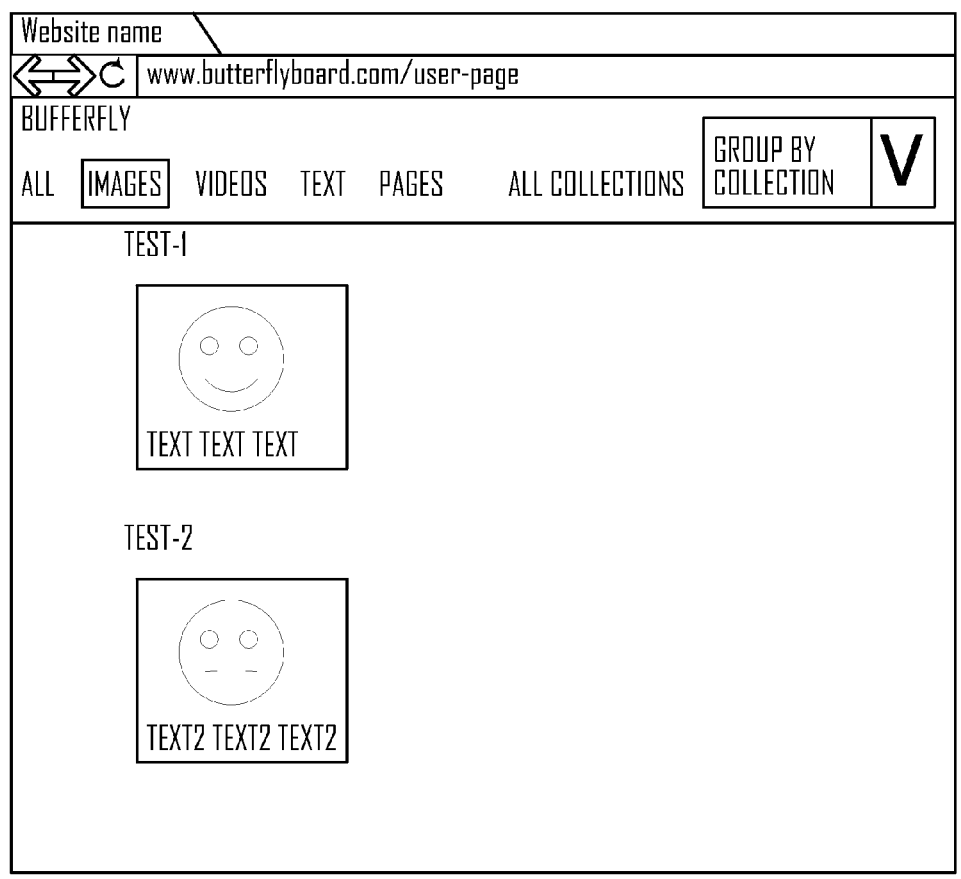
FIG. 15 is an illustration of an embodiment of a Butterfly Board interface generated by an embodiment of the disclosure.
Figure 16:
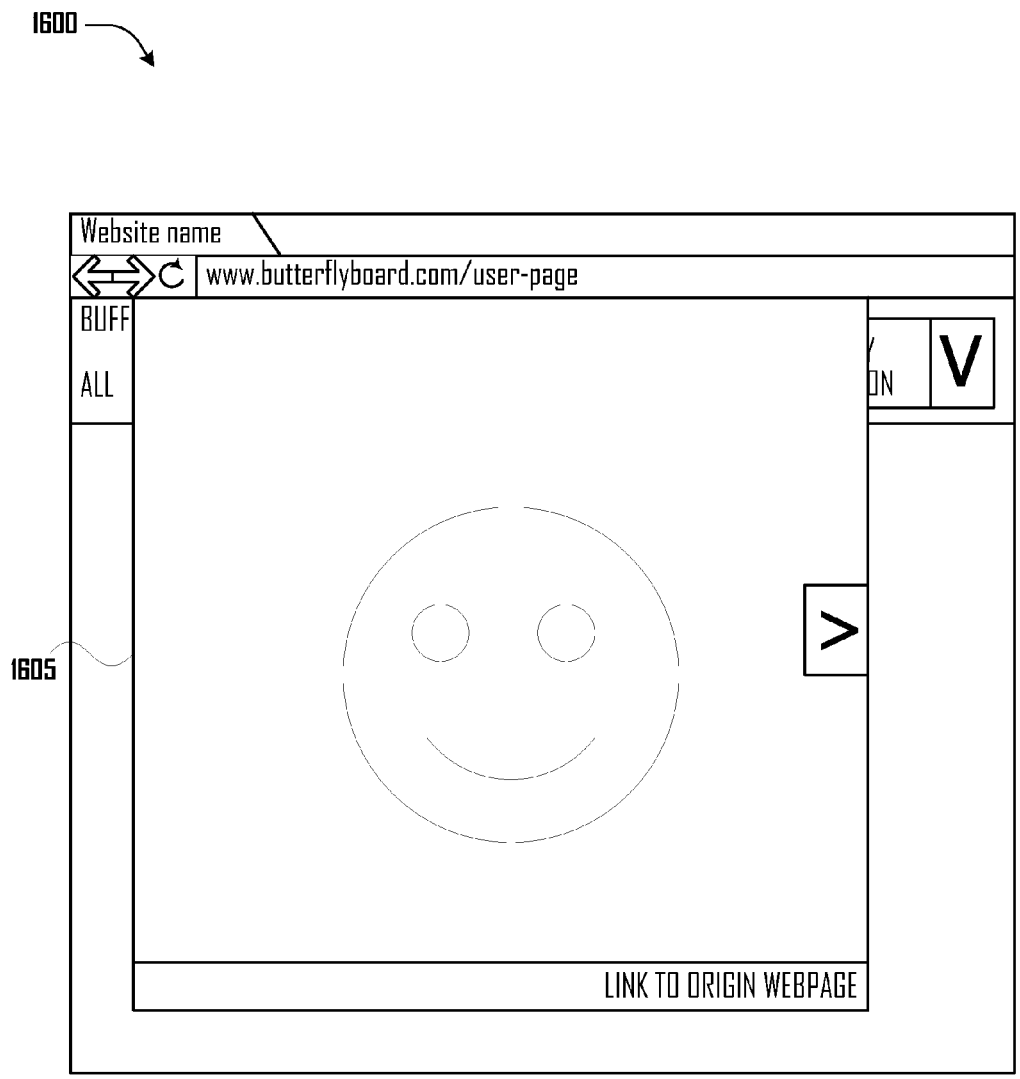
FIG. 16 is an illustration of an embodiment of a Butterfly Board interface and an Archived Image generated by an embodiment of the disclosure.
Figure 17:
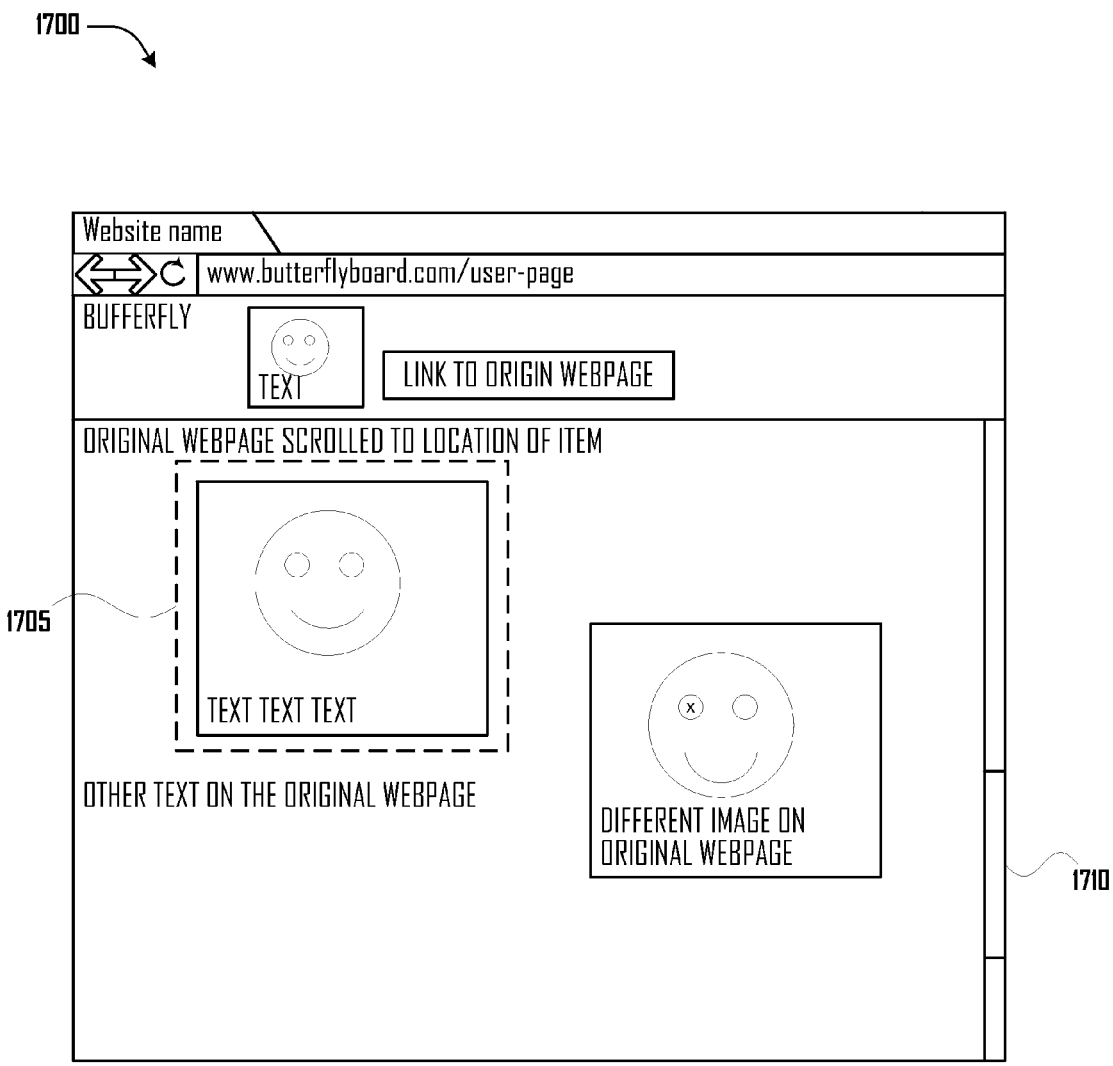
FIG. 17 is an illustration of an embodiment of a Butterfly Board interface and an Archive Page generated by an embodiment of the disclosure, which Archive Page is scrolled to the position of a User Selected Item, which User Selected Item is encircled by "marching ants."

At box 1085 the Client Browser (potentially executing instructions issued by the Butterfly App 315 or acting independently to render an Archive Page 310) renders the webpage, including with the marching ants around the selected text, and scrolls to the screen location. FIG. 17 shows the result of selecting element 2105 and rendering an Archive Page 310, including placement and rendering of marching ants around the selected text (element 22702 in FIG. 22). FIGS. 12, 15 and 23 shows another example in which a graphics Curl had been selected and placed on the user Butterfly Board 305 as element 12439 (in FIG. 12), which element 12439 had then been selected to produce element 23800 (in FIG. 23) and the second level selectable element 23802, which selectable element 23802 had been selected to go to the Archive Page shown in FIG. 17 as element 1700, including marching ants, depicted in element 1705, and adjustment to the scroll position, shown in element 1720.

Figure 11A:
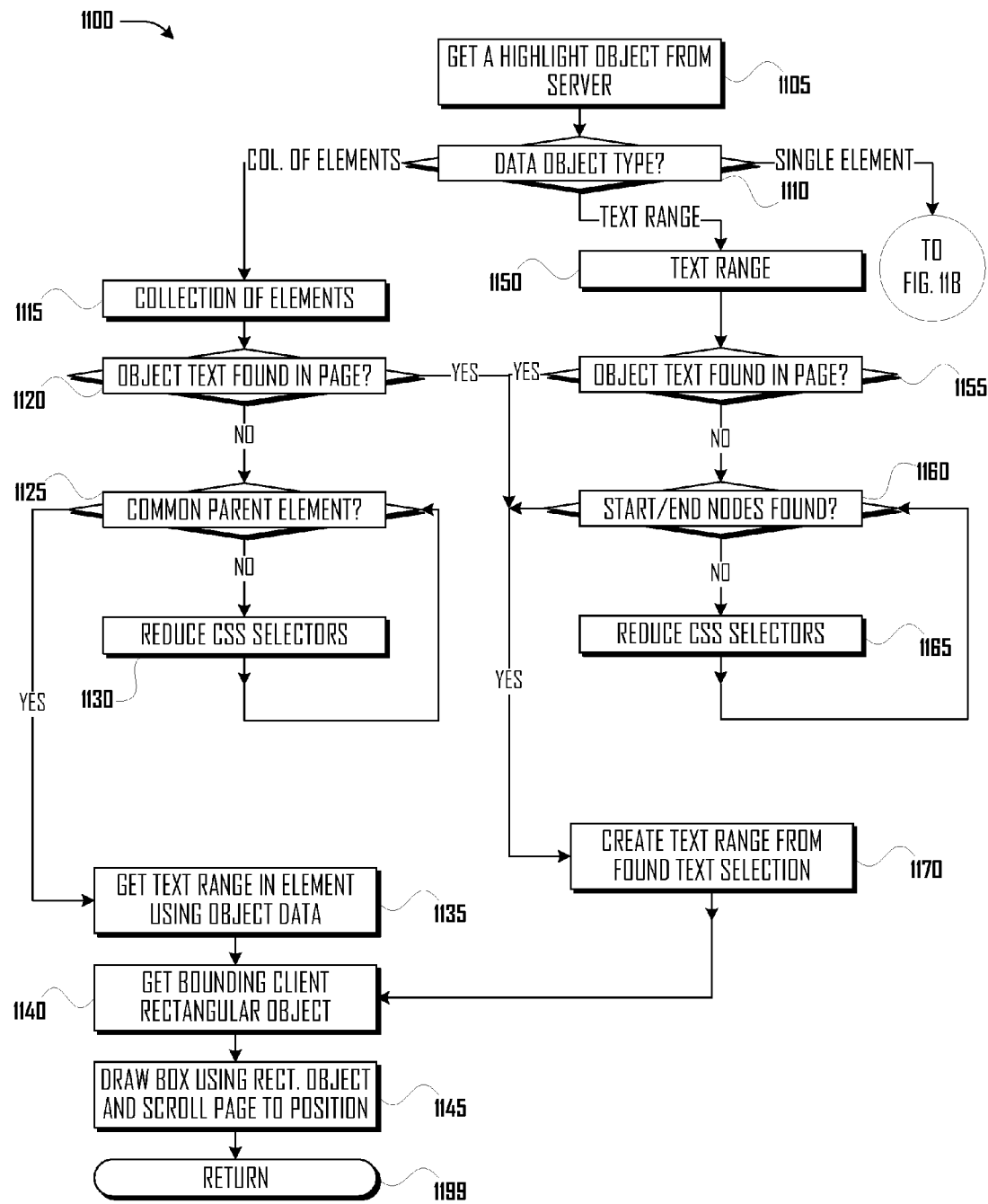
FIGS. 11A and 11B are flowcharts illustrating an embodiment of an Object Type Determination Routine 1100 performed in a Client Device 400.
Figure 11B:
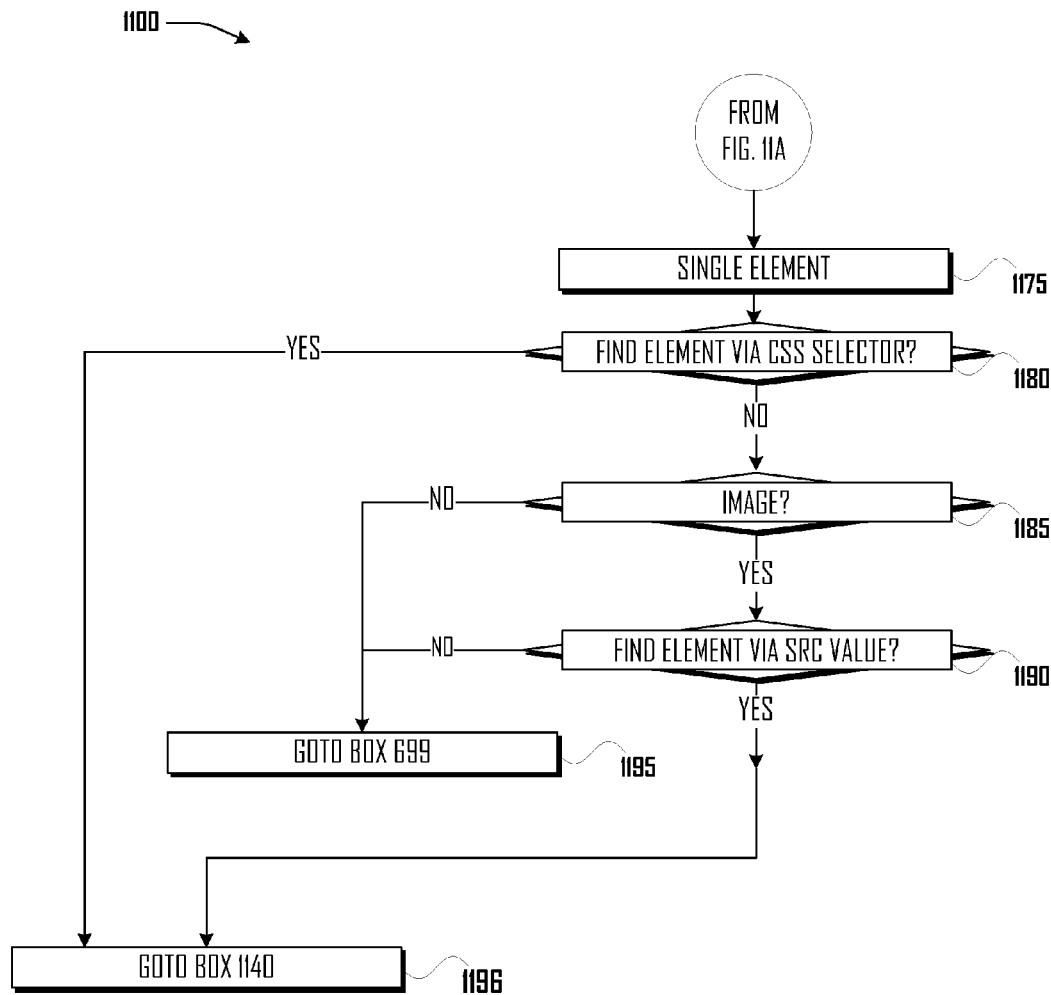

As indicated in element 1075 of FIG. 10, placing marching ants around the Item is further discussed in greater detail in relation to FIGS. 11A and 11B.

FIGS. 11A and 11B are flowcharts illustrating an embodiment of an Object Type Determination Routine 1100 performed in a Client Device 400. At box 1105, the Client Browser 465 receives an instruction to get an Item which is to receive the "marching ants." At step 1110, and executing Javascript downloaded as part of the Archive Page 310, a decision is made by the Client Browser 465 regarding the data type of the object which is to receive the "marching ants." If the object type is a collection of elements (text and links, text and an image, etc.), then the process proceeds to box 1115.

At box 1120, a determination is made regarding whether object text is found in the webpage. If object text is not found in the webpage, then at box 1125 a determination is made regarding whether a common parent element can be found for the collection of elements via, for example, CSS selectors. If no, then the CSS selectors are reduced at box 1130 and the process returns to box 1125 and iterates until a common parent element can be found (or an escape clause is triggered). Reduction of the CSS selectors may comprise removing CSS selectors until the CSS selectors are empty (which may trigger an "end process" step, not shown).

Upon identification of a common parent element, the process proceeds to box 1135 where the text range in the element is obtained using the object data. At box 1140 the bounding rectangular object is obtained (including the page position) and then, at box 1145, the box with the marching ants is drawn according to the obtained rectangular object and instructions are obtained to enable scrolling the page to the position of the rectangular object. At box 1199, the process may then return to FIG. 10 and box 1080.

At box 1150 in FIG. 11, the data object type in step 1110 was determined to be a text range. At box 1155, a determination is made regarding whether the object text is found in the webpage. If no, then at box 1160, a determination is made regarding whether start and end nodes for the object text are found via a CSS selectors and other stored data. If no, then at box 1165 the CSS selectors are reduced (reduction of the CSS selectors may comprise removing CSS selectors until the CSS selectors are empty, which may trigger an "end process" step, not shown) and the process returns to step 1160 and iterates until the start and end nodes can be found (or an escape clause is triggered). If yes at box 1160, then at box 1115 a text range is created from the found text selection. The process then continues to box 1140.

Turning to FIG. 11B, at box 1175, the data object type in box 1110 was determined to be a single element. At box 1180, a determination is made regarding whether the element can be found via, for example, a CSS selector. If yes, then the process then continues to box 1140. If no at step 1180, then at step 1185, a determination is made regarding whether the single object is an image. If yes, then at step 1190, a determination is made regarding whether element can be found via its src attribute value (the document address in an iframe; typically a URL). If yes, then at box 1196 the process then continues to box 1140.

FIG. 12 is an illustration of an embodiment of a Client Device 400 interface generated by an embodiment of the disclosure, illustrating a webpage with a Whole Page Curl and a Selected Text Curl. FIG. 12 illustrates a screen-shot of a Client Device 400 which has loaded a Webpage 1200 (served by, for example, the Webserver 110, and stored in the Client Device 400 as Webpage 320) and, using the Client Browser 465 and the Butterfly App 315, has rendered the Webpage 1200 within the Client Browser 465 user interface.

FIG. 12 illustrates that a Whole Page Curl 1205 has been added to the upper left-hand corner of the Webpage 1200 by the Butterfly App 315. The Whole Page Curl 1205 is an object which enables client Curl Interactions with the Webpage 1200. As discussed above, the Whole Page Curl 1205 may be displayed for a period of time, following which, if the user does not interact with the Whole Page Curl 1205, the Butterfly App 315 may (or the Butterfly App 315 causes the Client Browser 465 to) remove the Curl. Removal of the Curl may, for example, involve playing an animation (a sequence of images perceived as motion) to cause the Curl to appear to fade, withdraw, or otherwise change as the Curl is removed. If the user mouse (or other programmed triggering input interaction, such as a gesture or contact with a touch screen, voice commands, keyboard command, or similar) approaches the corner of the Webpage 1200 where the Curl had been (or otherwise triggers an interaction command sequence relative to the Whole Page Curl object), the Whole Page Curl 1205 may be rendered again, including through the execution of an animation sequence as discussed above.

FIG. 12 also illustrates a bottom-up Selected Text Curl 1210. In this embodiment, the user selected the text starting at the bottom right-hand corner of the selected text and finishing in the upper left-hand corner of the selected text area, approximately beneath the bottom-up Selected Text Curl 1210. If the user selected the text starting at the top of the text and finishing at a point to the right and/or below the initial selection location, the Curl would be a top-down Selected Text Curl and the Curl graphical object may be inverted and flipped along the horizontal axis, relative to the bottom-up Selected Text Curl (the Butterfly App 315 may provide separate graphics for the various Curls or may reuse a common set of graphics with appropriate inversions and axis flipping).

After the user completes the text-selection action, the Selected Text Curl becomes visible beneath the user's mouse, making it convenient for the user to interact with the Curl.

The user interacts with any Curl by clicking on the Curl (the click may be a right or left click, or may require simultaneous user activation of a key on a keyboard), following which a menu is opened proximate to the Curl, for example, within the browser window, such as overlayed on the webpage. See for example, FIG. 18 and element 1805, which menu provides "Save," "Share," and "Feedback" options to the user. The "Save" option within the menu is populated with "Collections" in the user's Butterfly Board, to which the Item may be saved; see for example, element 1905 in FIG. 19, which shows a dropdown list of the user's Collections. See also element 1405 in FIG. 14, which shows two labels of Collections within a user's Butterfly Board 1400. See also element 1410 in FIG. 14, which shows a link which says, "All Collections" and which, when clicked, presents a drop down list allowing the user to select to display a selection of the Collections. An example of the "Share" option within the menu is shown in element 2005 in FIG. 20, which includes icons for different social networks, which includes an "Add a comment" field to receive user input, and which includes a "post" or "share" button to confirm that the clipped Item should be posted to the selected social network.

Figure 13:
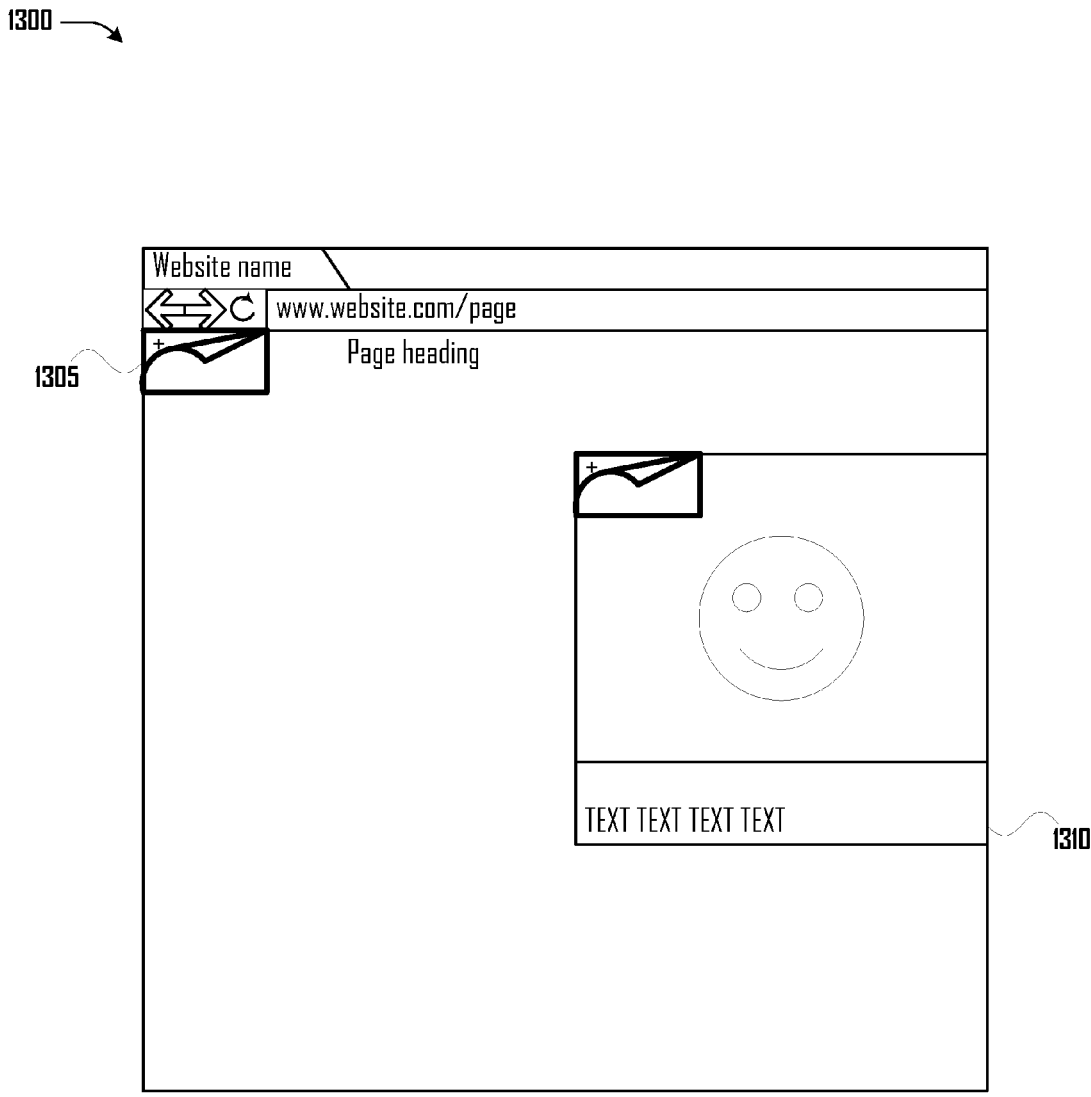
FIG. 13 is an illustration of an embodiment of a Client Device 400 interface generated by an embodiment of the disclosure, illustrating a webpage with a Whole Page Curl and an Image Curl.

FIG. 13 is an illustration of an embodiment of a Client Device 400 interface generated by an embodiment of the disclosure, illustrating a webpage with a Whole Page Curl and an Image Curl.

Figure 14:
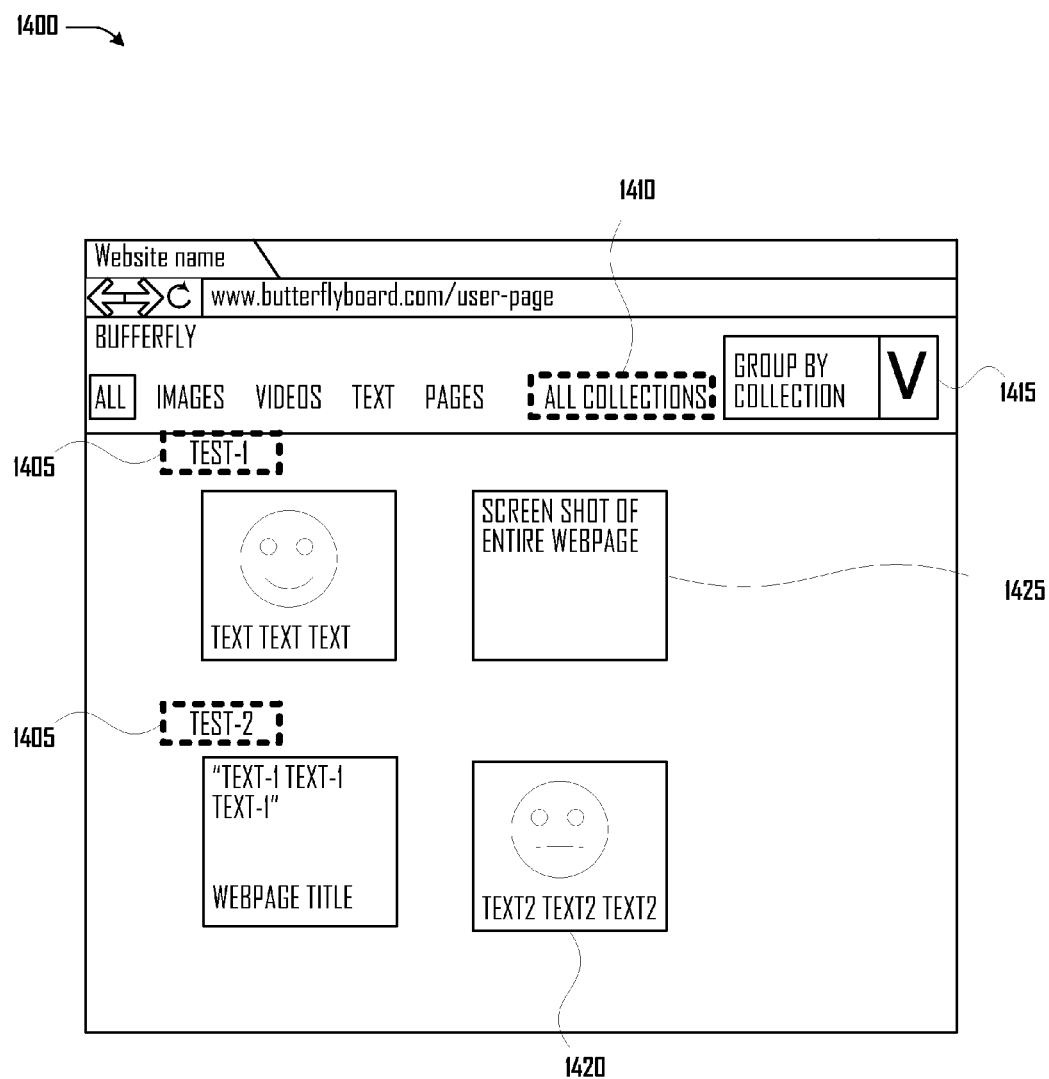
FIG. 14 is an illustration of an embodiment of a Butterfly Board interface generated by an embodiment of the disclosure.

FIG. 14 is an illustration of an embodiment of a Butterfly Board interface generated by an embodiment of the disclosure. FIG. 14 illustrates a Client Browser 465 which is rendering a webpage comprising the Butterfly Board for a user 1400, which user's Butterfly Board 1400 comprises a screenshot 1425 of a webpage, such as, for example, 1300 in FIG. 13, which webpage 1300 was saved via a Save, Curl Interaction.

The above Detailed Description of embodiments is not intended to be exhaustive or to limit the clipping system to the precise form disclosed above. While specific embodiments of, and examples for, the clipping system are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of identifying content to be recorded, the method performed in a computer comprising a memory, the method comprising:
   in the computer, receiving from a first server a webpage comprising a first item and rendering the webpage, the first item being a video element or an IMG or block level element;
   rendering a first identifier which indicates to a user of the computer that the webpage may be recorded;
   in response to a user selection of the first item, determining an element type of the first item and rendering a second identifier which indicates to the user that the first item may be recorded;
   in response to a current user selection position, determining that there is not one or more IMG or block level elements at the current user selection position, traversing up the DOM from the first item for an element not of a specified type, determining that the element not of a specified type is valid, counting the number of words in all inline children and keeping the element if it has more than a minimum number of words, and highlighting the words; and
   in response to a user selection of at least one of the element not of a specified type or the webpage, transmitting the user selection to a second server in conjunction with an instruction to record the user selection.

2. The method according to claim 1, wherein the determined element type is a video element, obtaining video handler objects corresponding to the element type, passing the first item's parameter to at least one of the obtaining video handler objects, determining that there is a match with the at least one video handler object, determining that the video element is a flash video and/or else setting the first element's WMODE attribute to OPAQUE, and utilizing the at least one video handler object to highlight the first item.

3. The method according to claim 1, wherein the determined element type is an IMG or block level element, determining that the element type has dimensions larger than a minimum size, obtaining a list of all IMG or block level elements at a current user selection position, determining that there is one or more IMG or block level elements at the current user selection position, and highlighting the determined IMG or block level elements at the current user selection position.

4. The method according to claim 1, wherein the specified types comprise BODY, FORM, BUTTON, LABEL, HTML, TEXTAREA, INPUT, SELECT, UL, OL, TABLE, TBODY, THEAD, TR, TH, STYLE, SCRIPT, NONSCRIPT, CITE, and AREA types.

5. The method according to claim 1, further comprising wherein the minimum number of words is fifteen.

6. The method according to claim 1, further comprising transmitting to the second server an instruction to share the recorded first item or webpage.

7. The method according to claim 1, further comprising receiving from the server the recorded webpage and the recorded first item, scrolling to position of the recorded first item in the recorded webpage, and highlighting the recorded first item.

8. The method according to claim 7, wherein highlighting the recorded first item comprises determining that the recorded first item is one of a collection of elements, a text range, or a single element and identifying the collection in the recorded webpage.

9. The method according to claim 8, wherein identifying the collection of elements, text range, or single element in the recorded webpage comprises reducing the CSS selectors until a common parent element is found, reducing the CSS selectors until start/end nodes are found, or finding the element via an SRC value.

10. The method according to claim 1, further comprising transmitting to the serve an instruction to group the recorded webpage and the recorded first item in a collection.

11. The method according to claim 1, further comprising:
determining that the computer is permitted to archive the HTML;
recording the webpage and the first item as images and as HTML;
receiving a request from the first client computer or a second client computer for the recording of the webpage and the first item; and
obtaining dynamic content in the webpage.

12. The method according to claim 11, wherein recording the webpage and the first item as images and as HTML comprises excluding from the recording dynamic content in the webpage.

13. The method according to claim 11, wherein the dynamic content comprises advertisements.

14. The method according to claim 11, wherein determining that the computer is permitted to archive the HTML comprises determining that there is no NOARCHIVE metatag in data relating to the webpage.

15. A computing apparatus for identifying content in a webpage to be recorded, the apparatus comprising a processor and a memory storing instructions that, when executed by the processor, configure the apparatus to:
in the computer, receive from a first server a webpage comprising a first item and render the webpage, the first item being a video element or an IMG or block level element;
render a first identifier which indicates to a user of the computer that the webpage may be recorded;
receive a user selection of the first item;
in response to the user selection of the first item, determine an element type of the first item and rendering a second identifier which indicates to the user that the first item may be recorded;
in response to a current user selection position, determine that there is not one or more IMG or block level elements at the current user selection position, traverse up the DOM from the first item for an element not of a specified type, determine that the element not of a specified type is valid, count the number of words in all inline children and keep the element if it has more than a minimum number of words, and highlight the words; and
in response to a user selection of at least one of the element not of a specified type or the webpage, transmit the user selection to a second server in conjunction with an instruction to record the user selection.

16. A non-transient computer-readable storage medium having stored thereon instructions that, when executed by a processor, configure the processor to:
in a computer, receive from a first server a webpage comprising a first item and render the webpage, the first item being a video element or an IMG or block level element;
render a first identifier which indicates to a user of the computer that the webpage may be recorded;
receive a user selection of the first item;
in response to the user selection of the first item, determine an element type of the first item and render a second identifier which indicates to the user that the first item may be recorded;
in response to a current user selection position, determine that there is not one or more IMG or block level elements at the current user selection position, traverse up the DOM from the first item for an element not of a specified type, determine that the element not of a specified type is valid, count the number of words in all inline children and keep the element if it has more than a minimum number of words, and highlight the words; and
in response to a user selection of at least one of the element not of a specified type or the webpage, transmit the user selection to a second server in conjunction with an instruction to record the user selection.

* * * * *